US012682018B2

(12) United States Patent  (10) Patent No.: US 12,682,018 B2
Schwarz et al.  (45) Date of Patent: ***Jul. 14, 2026

(54) SYSTEM AND METHOD FOR AUTOMATIC MARK MANAGEMENT ON THE BLOCKCHAIN

(71) Applicant: Brand Therapy LLC, Hastings on Hudson, NY (US)

(72) Inventors: Jaime Schwarz, Hastings on Hudson, NY (US); Ganesh Gopalkrishna Hegde, Saarbruecken (DE)

( * ) Notice: Subject to any disclaimer, the term of this patent is extended or adjusted under 35 U.S.C. 154(b) by 108 days.

This patent is subject to a terminal disclaimer.

(21) Appl. No.: 18/657,921

(22) Filed: May 8, 2024

(65) Prior Publication Data

US 2024/0378264 A1 Nov. 14, 2024

Related U.S. Application Data

(60) Provisional application No. 63/502,074, filed on May 12, 2023.

(51) Int. Cl.
*G06F 21/10* (2013.01)
*H04L 9/40* (2022.01)

(52) U.S. Cl.
CPC ........ *G06F 21/101* (2023.08); *H04L 63/0823* (2013.01)

(58) Field of Classification Search
CPC ... G06Q 20/00–425; G06Q 40/00–128; G06Q 2220/00–18; G06F 21/00–88; H04L 63/00–308
See application file for complete search history.

(56) References Cited

U.S. PATENT DOCUMENTS

| | | | |
|---|---|---|---|
| 11,270,318 B1 * | 3/2022 | Schwarz | G06Q 30/018 |
| 12,086,932 B2 * | 9/2024 | Karadayi | G06T 13/40 |
| 2010/0083112 A1 * | 4/2010 | Dawson | G06Q 10/00 |
| | | | 715/706 |
| 2015/0371295 A1 * | 12/2015 | Gill | A63F 13/79 |
| | | | 463/25 |
| 2017/0155515 A1 * | 6/2017 | Androulaki | H04L 9/006 |
| 2021/0166025 A1 * | 6/2021 | Wang | H04N 21/23418 |
| 2021/0279962 A1 * | 9/2021 | Hutten | G06T 19/006 |
| 2023/0009304 A1 * | 1/2023 | Jakobsson | G06Q 30/0241 |

* cited by examiner

*Primary Examiner* — Chenyuh Kuo
(74) *Attorney, Agent, or Firm* — GRAESER ASSOCIATES INTERNATIONAL INC; Dvorah Graeser

(57) ABSTRACT
A system and method to permit brand owners to maintain control over their valuable brands in a virtual economy. The system and method feature a mark to permit legitimate branded items to be identified. Optionally and preferably, the system and method also enable non-legitimate, "fake" or fraudulent branded items to be identified. Such branded items include but are not limited to, any type of trademark, including without limitation any type of word mark, color, logo, slogan or any other suitable type of trademark; any object designed by or associated with the brand; and any item featuring any component or material that is trademarked, patented or copyrighted.

20 Claims, 29 Drawing Sheets

100

100

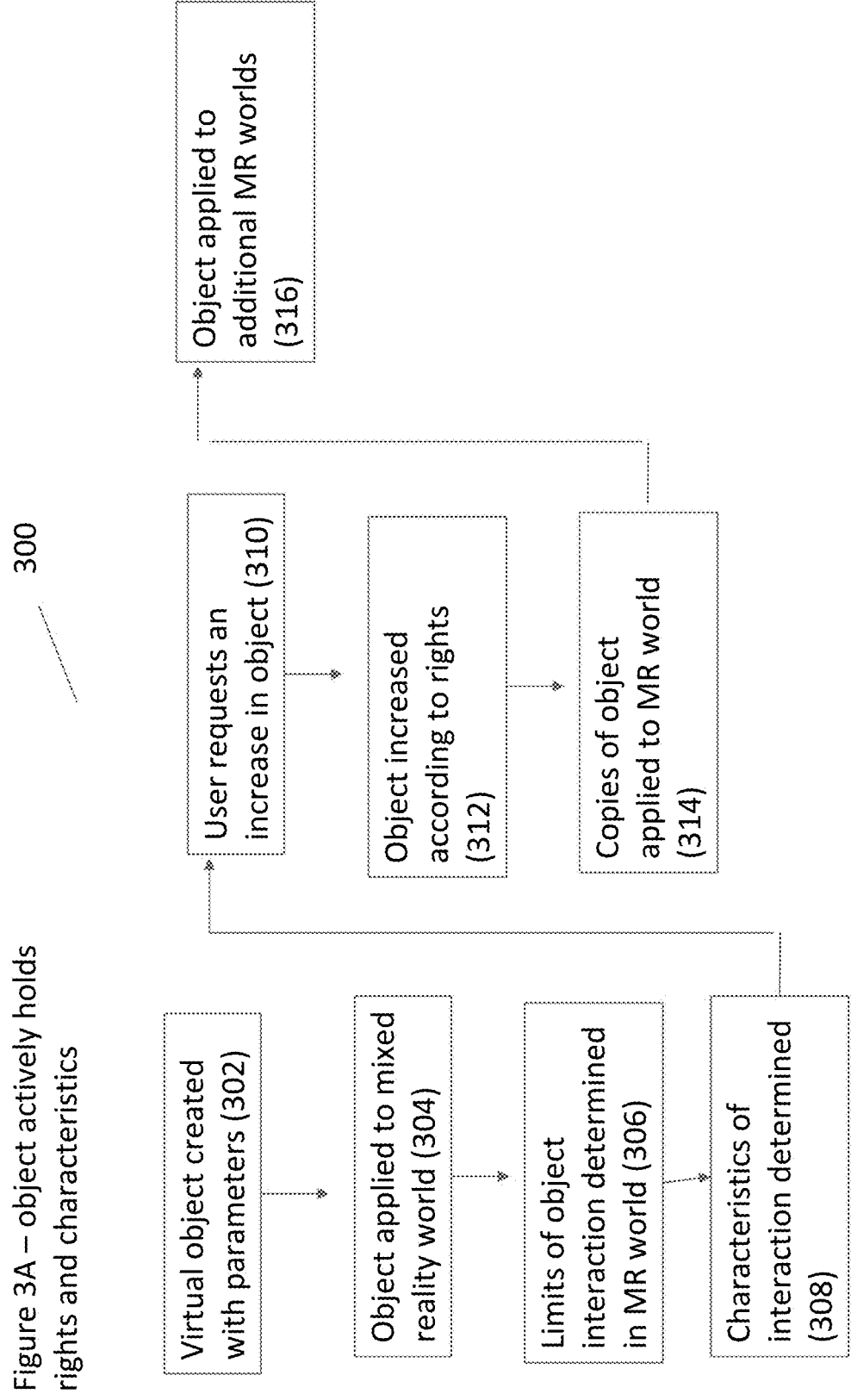
Figure 3A – object actively holds rights and characteristics

Figure 3B:
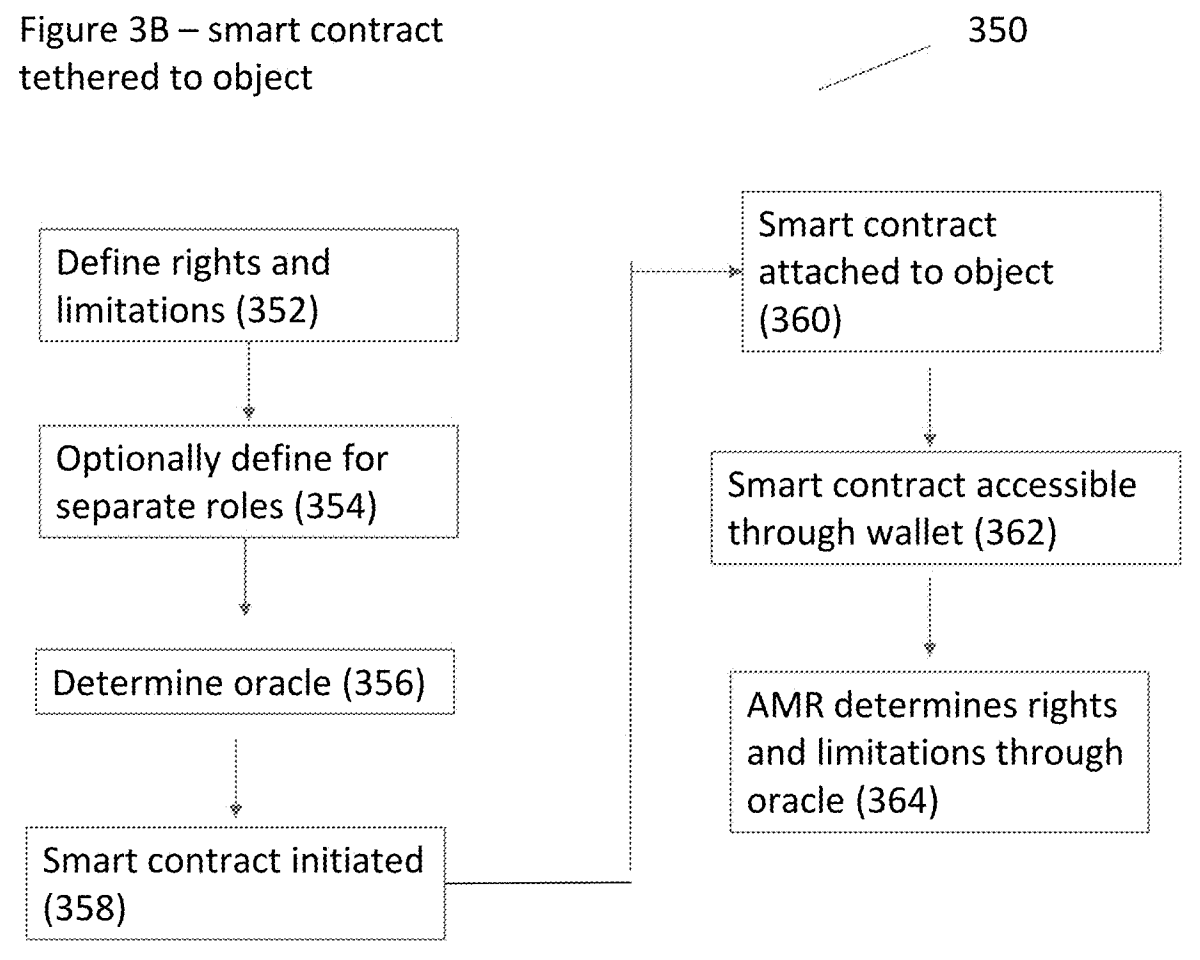

350

Figure 3B – smart contract tethered to object

Define rights and limitations (352) → Optionally define for separate roles (354) → Determine oracle (356) → Smart contract initiated (358)

Smart contract attached to object (360) → Smart contract accessible through wallet (362) → AMR determines rights and limitations through oracle (364)

Figure 3C:
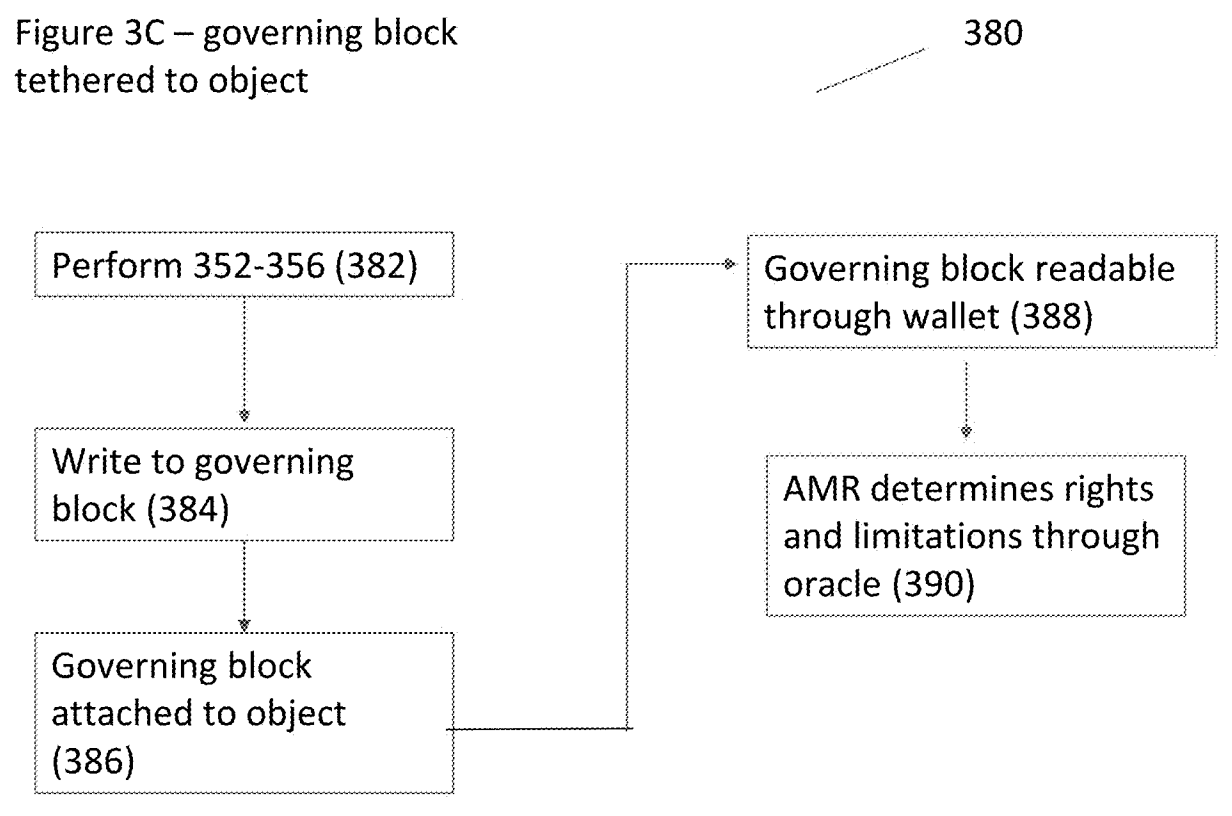

Figure 3C – governing block tethered to object

380

Perform 352-356 (382)

Write to governing block (384)

Governing block attached to object (386)

Governing block readable through wallet (388)

AMR determines rights and limitations through oracle (390)

400

425

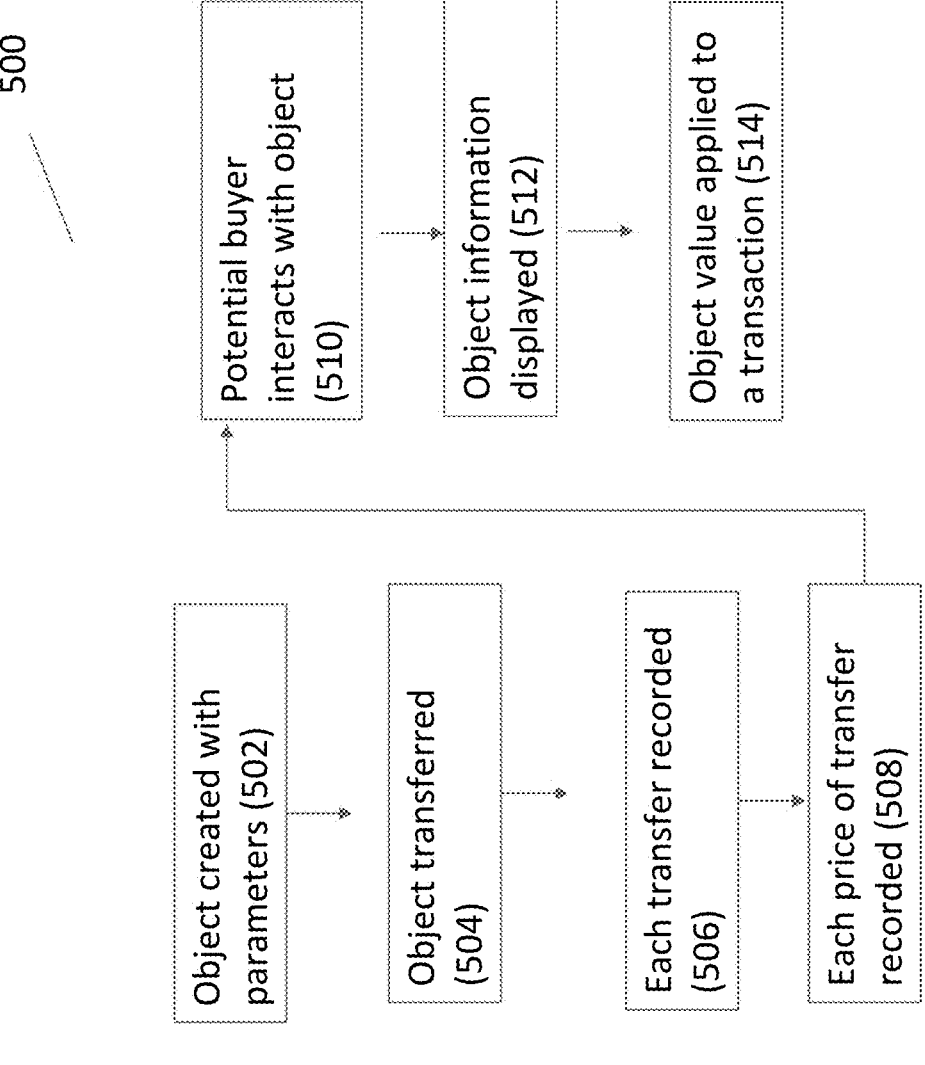
Figure 5 – object as repository of value/wallet
500
Potential buyer interacts with object (510)
Object information displayed (512)
Object value applied to a transaction (514)
Object created with parameters (502)
Object transferred (504)
Each transfer recorded (506)
Each price of transfer recorded (508)

600

Create virtual good ID
(602)

Create virtual good
parameters (604)

Record ID and parameters
(606)

Connect ID to virtual
good (608)

Record connection
(610)

Distribute virtual good
across systems (612)

Record ownership (614)

Monitor behavior of
virtual good across
systems (616)

Figure 7

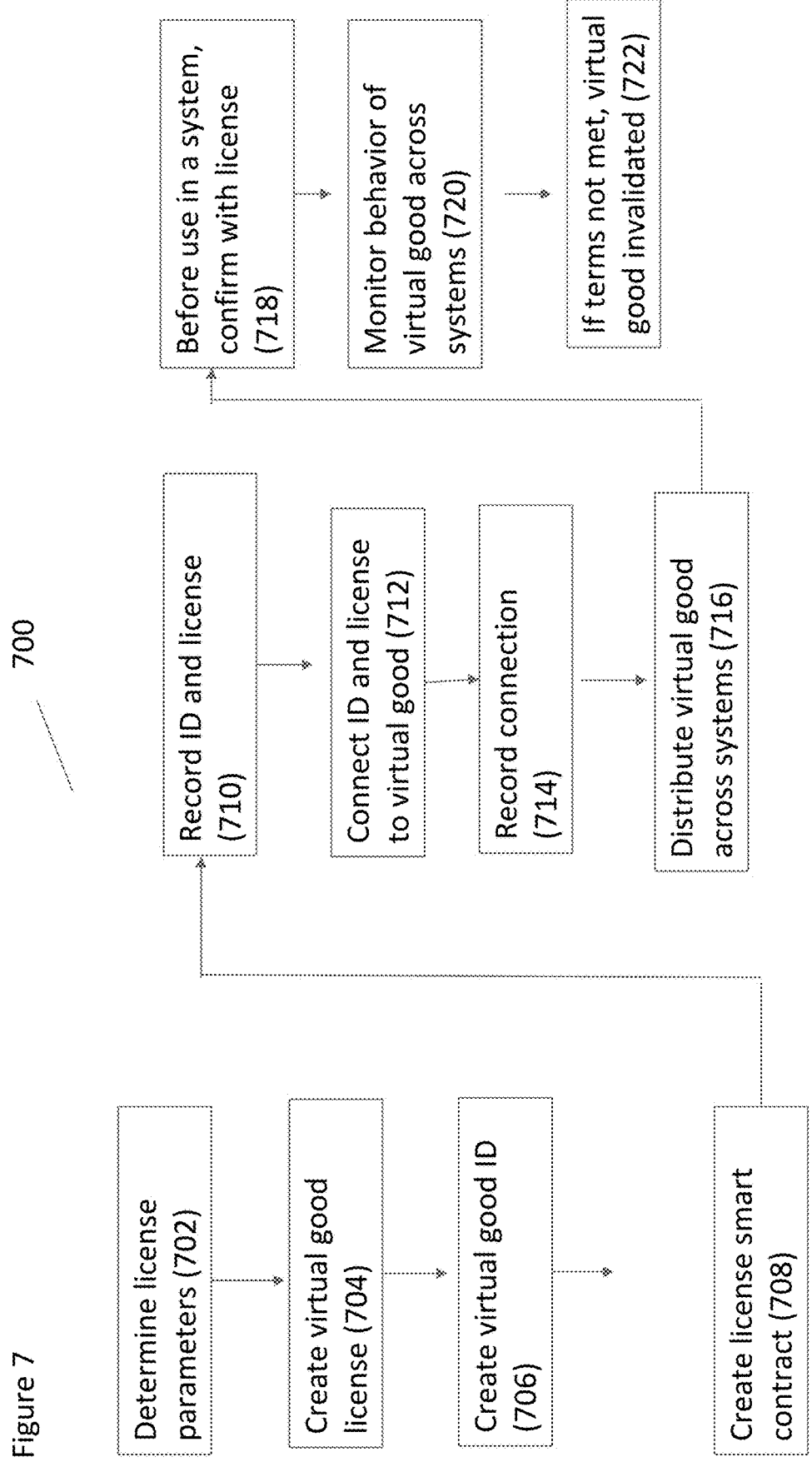

700

Determine license parameters (702)

Create virtual good license (704)

Create virtual good ID (706)

Create license smart contract (708)

Record ID and license (710)

Connect ID and license to virtual good (712)

Record connection (714)

Distribute virtual good across systems (716)

Before use in a system, confirm with license (718)

Monitor behavior of virtual good across systems (720)

If terms not met, virtual good invalidated (722)

800

Figure 9 – standard brand language and filters

900

Brand determines object parameters (902)

Object parameters applied to smart contract (904)

Filters applied to smart contract (906)

Oracle selected for smart contract (908)

Smart contract applied to object (910)

AMR interrogates parameters and filters through oracle (912)

Oracle sends from smart contract (914)

AMR determines object behavior (916)

1200
Figure 12 – extended chain of provenance
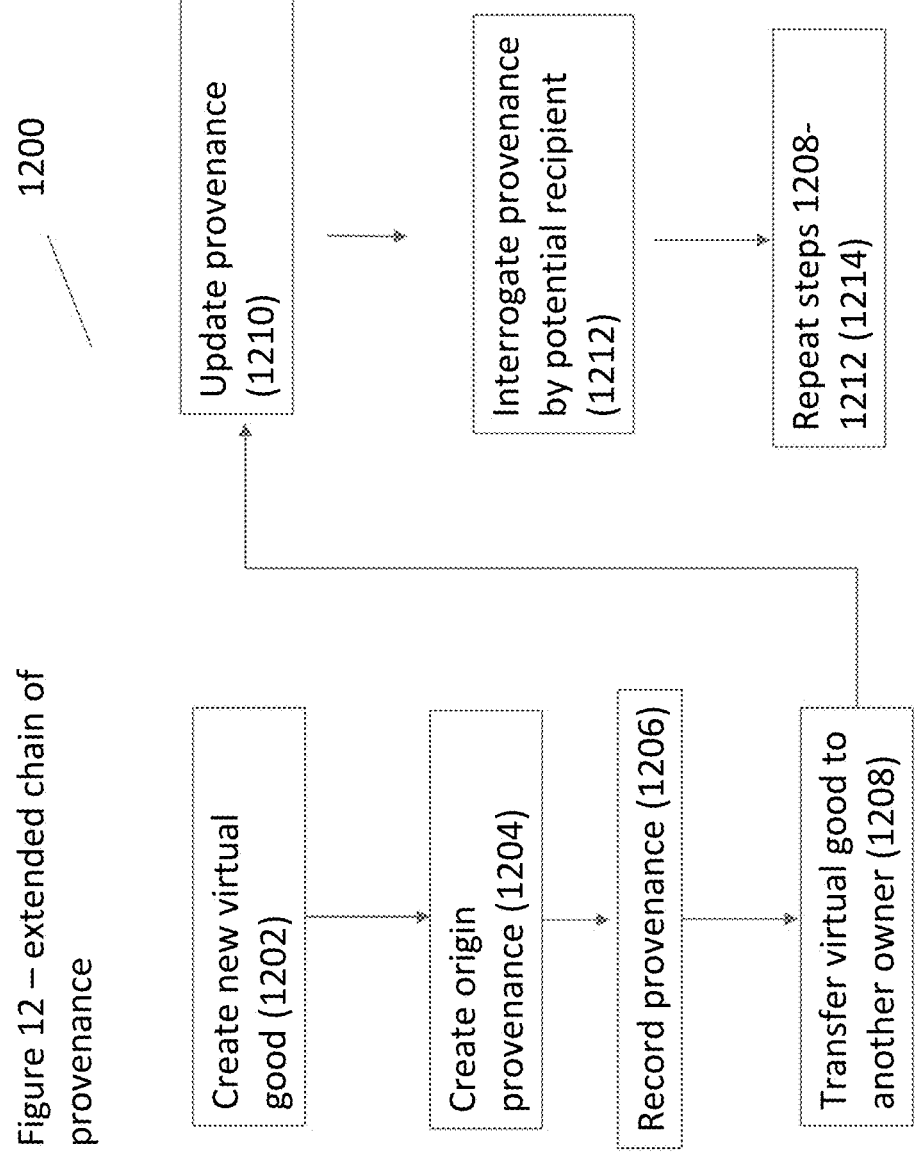

Figure 13:
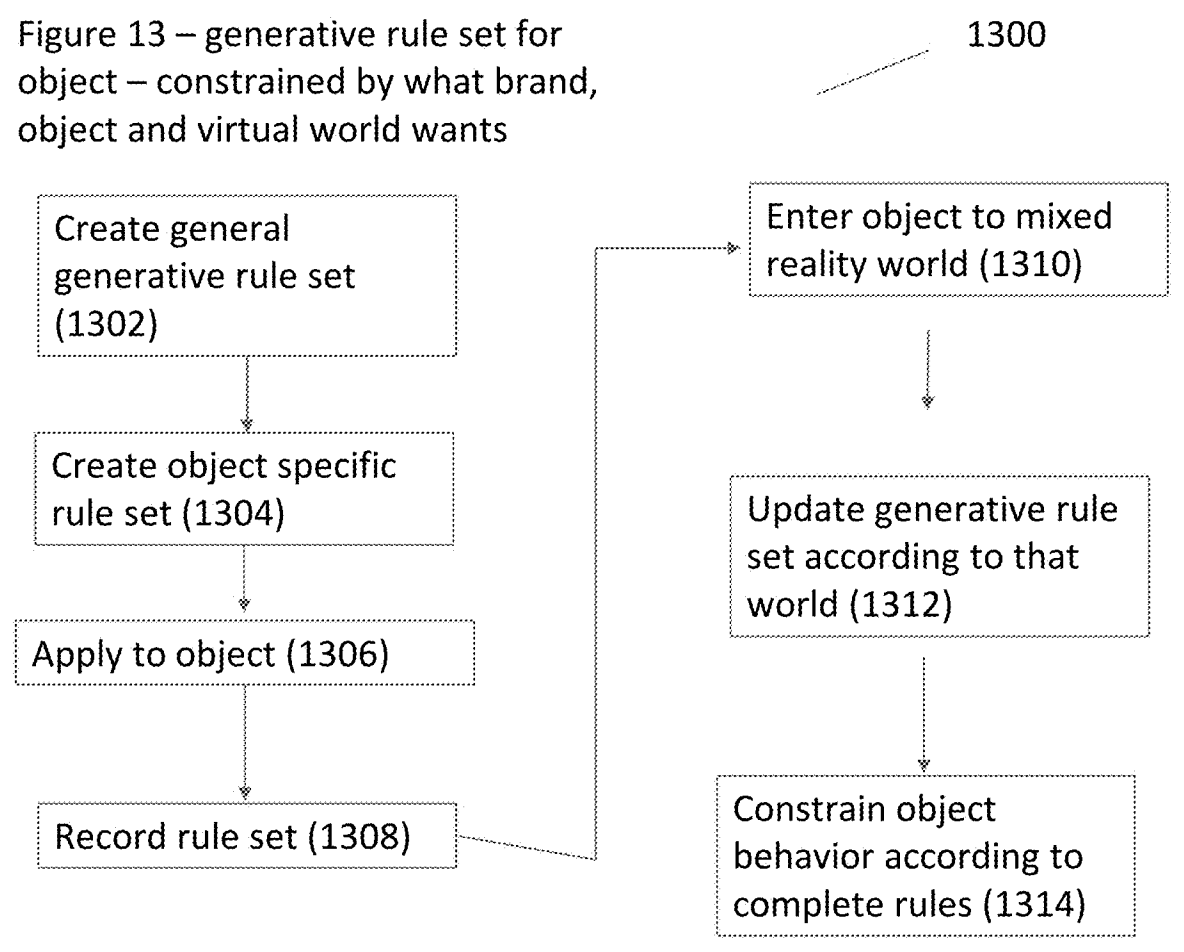

1300

Figure 13 – generative rule set for object – constrained by what brand, object and virtual world wants Create general generative rule set (1302)

Create object specific rule set (1304)

Apply to object (1306)

Record rule set (1308)

Enter object to mixed reality world (1310)

Update generative rule set according to that world (1312)

Constrain object behavior according to complete rules (1314)

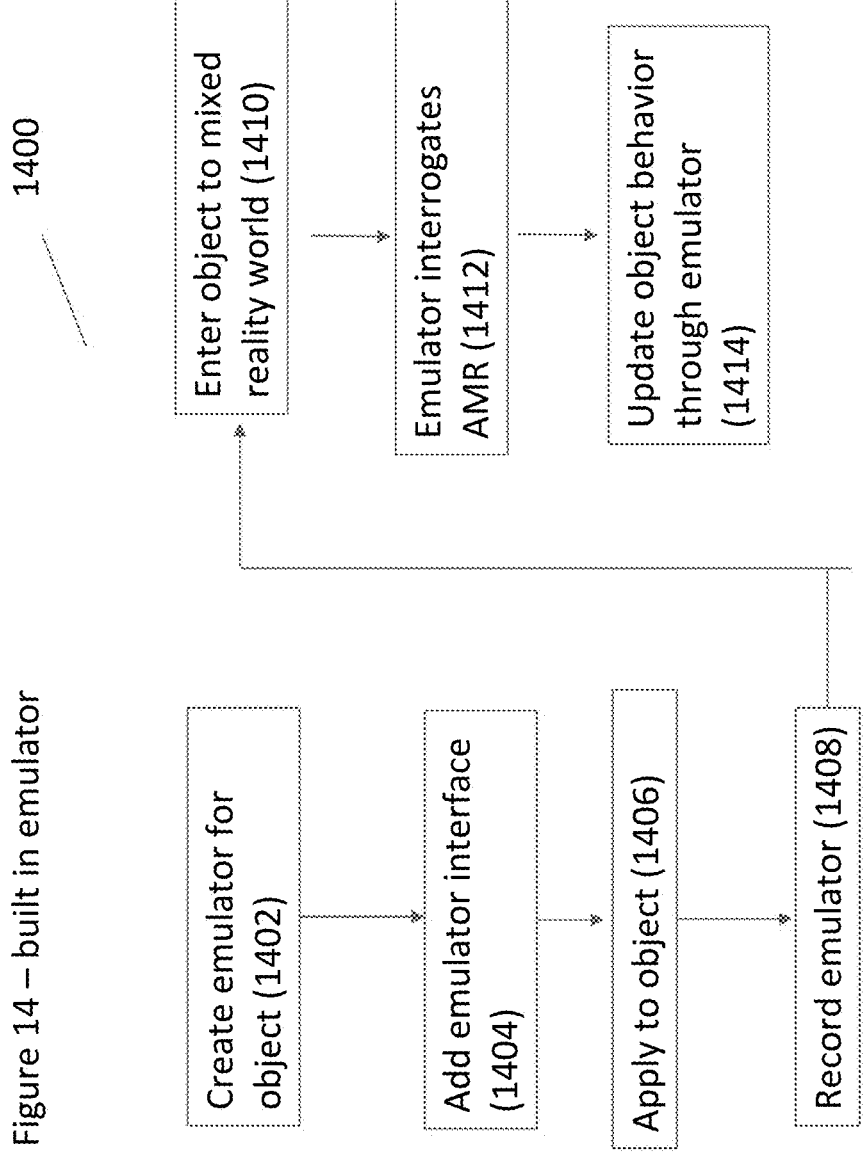
Figure 14 – built in emulator

Figure 15 – external emulator
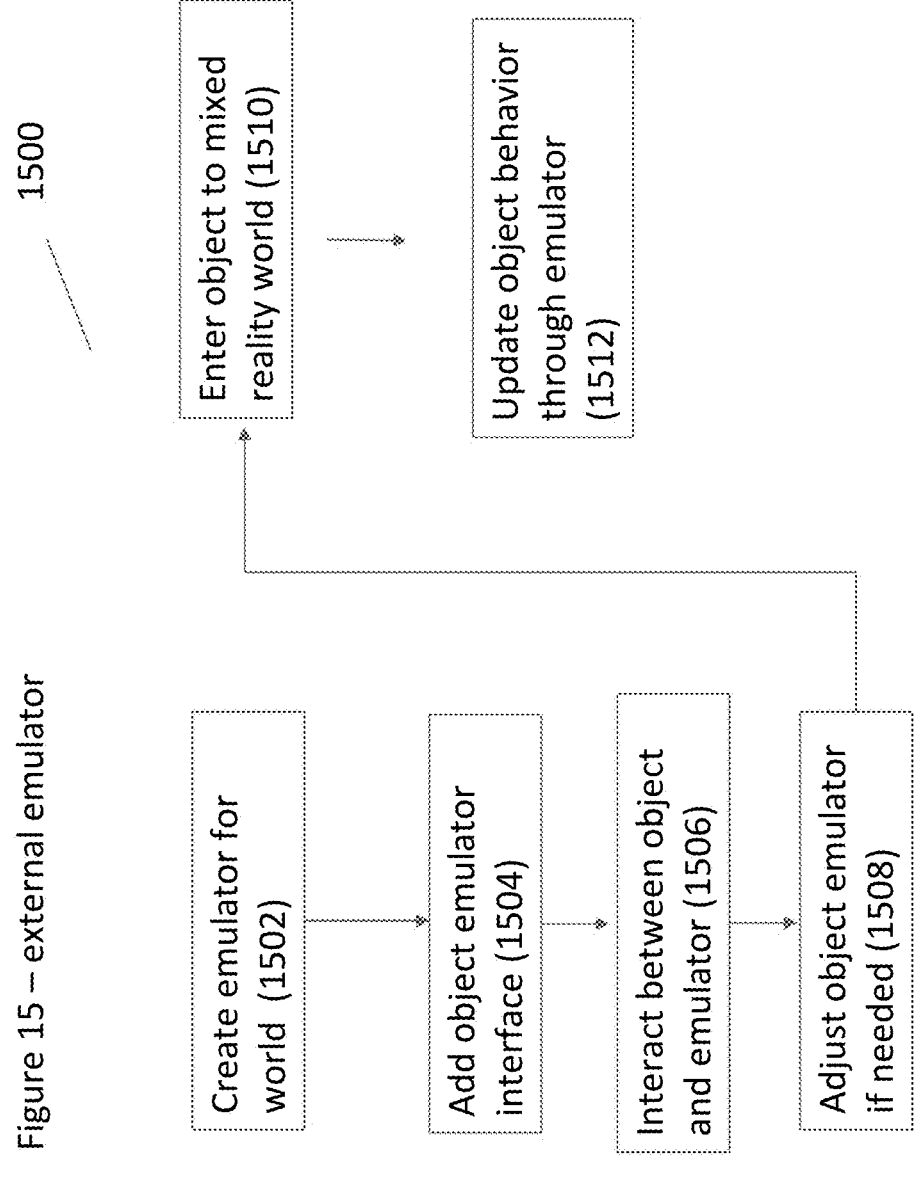

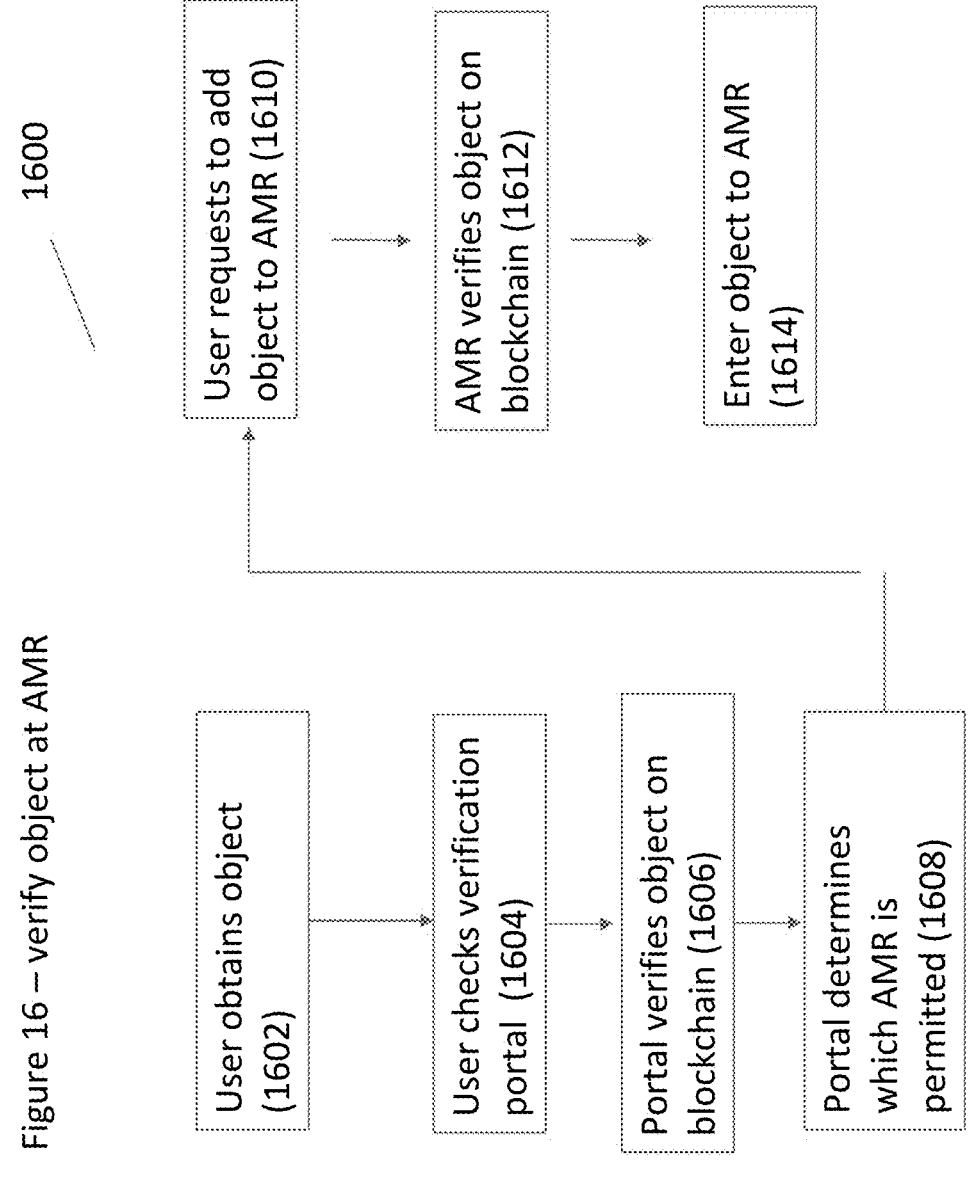
Figure 16 – verify object at AMR
1600

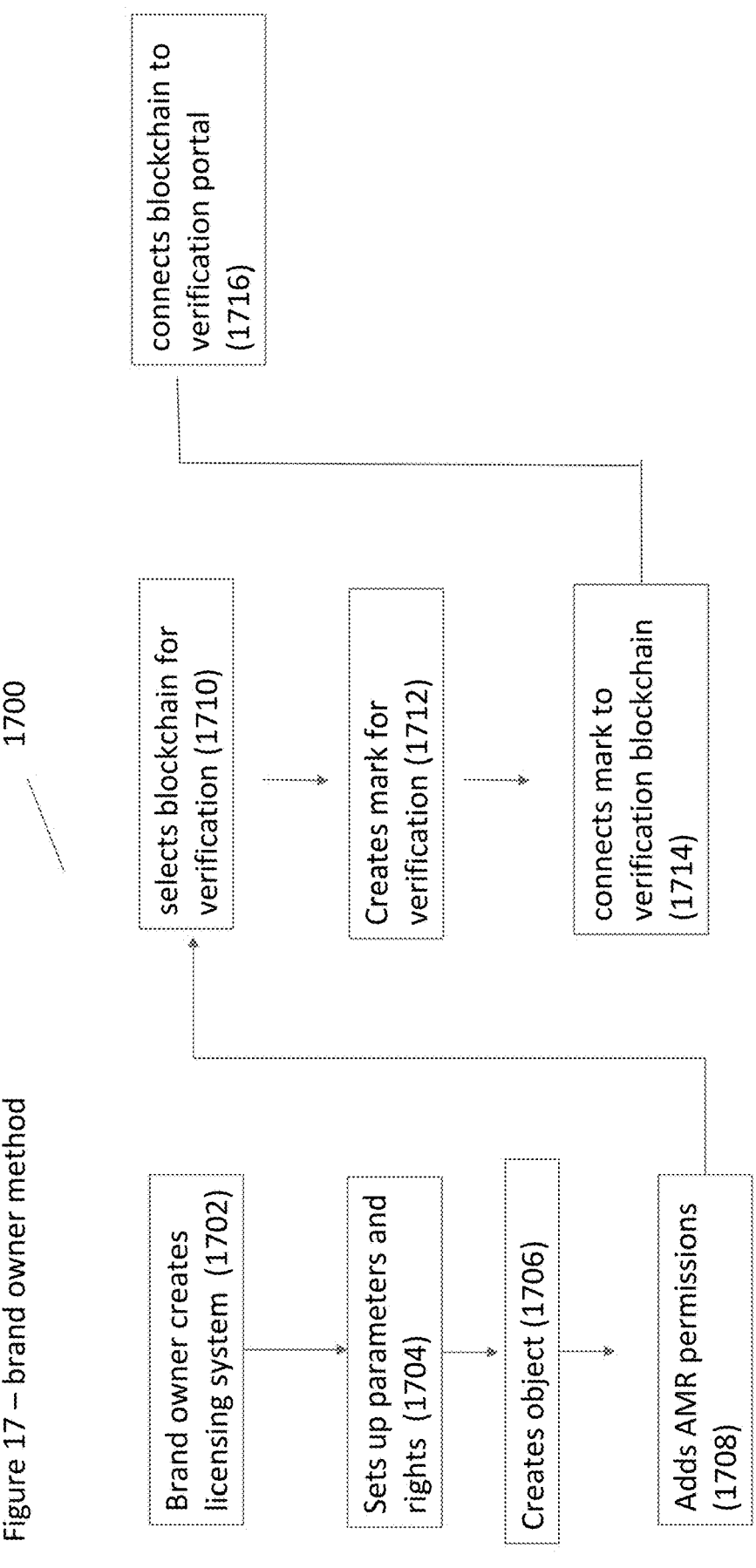
Figure 17 – brand owner method

1806E

2110

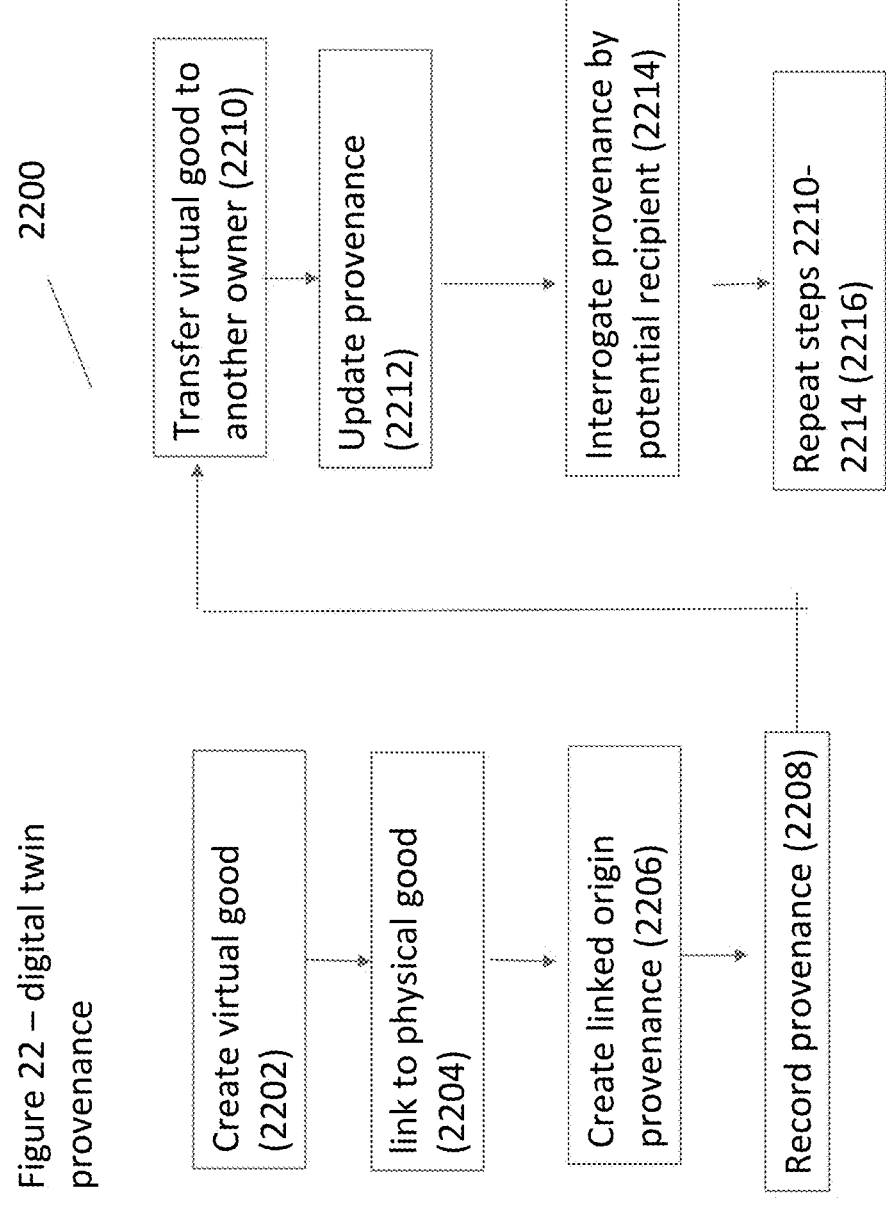
Figure 22 – digital twin provenance

1

SYSTEM AND METHOD FOR AUTOMATIC MARK MANAGEMENT ON THE BLOCKCHAIN

FIELD OF THE INVENTION

The present invention, in at least some aspects, is of a system and method for automatic mark management, and in particular, for such a system and method for automatic mark management on blockchain.

BACKGROUND OF THE INVENTION

Virtual goods are becoming an important part of the "real" (non-virtual) economy. It is widely known that many video games enable in-game purchases, which in turn provide a valuable revenue stream for their publishers. Objects that belong to established brands or that feature the trademarks of established brands are also being displayed in video games. Mixed reality environments such as a virtual world are also becoming increasingly popular, again featuring such objects or trademarks. Brand owners clearly wish to maintain control over their valuable brands, including with regard to their trademarks and copyrights. However no good solution currently exists to permit such control in the virtual economy.

BRIEF SUMMARY OF THE INVENTION

The background art does not teach or suggest a system or method to permit brand owners to maintain control over their valuable brands. The background art also does not teach or suggest a system or method to permit brand owners to maintain control over their valuable trademarks and copyrights.

The present invention, in at least some aspects, is of a system and method for identifying, certifying, tracking, protecting, and valuing virtual goods and in particular, for such a system and method for identifying such virtual goods through a mark.

In at least some embodiments, the present invention provides a system and method to permit brand owners to maintain control over their valuable brands in a virtual economy. The system and method feature a mark to permit legitimate branded items to be identified, and optionally for the behavior of such branded items to be controlled in an AMR (authorized mixed reality environment).

Such branded items include but are not limited to, any type of trademark, including without limitation any type of word mark, color, logo, slogan or any other suitable type of trademark; any object designed by or associated with the brand; a creator signature or other indication of authorship; and any item featuring any component or material that is trademarked, patented or copyrighted. The brand owner may also be described herein as a "verified owner" who has the rights to the branded or otherwise identified item, and also to associated IP (intellectual property).

Optionally, the branded items are identified with a mark. The mark is preferably associated with information stored in a storage. The mark and/or related information thereto may be retrieved from the storage, for example to determine whether a branded item is legitimate. Optionally the storage comprises a database. Alternatively and/or additionally, the storage comprises a blockchain implemented storage. Also optionally, transactions related to the branded item are recorded in the storage, including but not limited to creation of the item, association with the mark, transfer of the item through sale, licensing and the like, and legitimate use of the branded item.

The mixed reality environment may optionally comprise any suitable type of environment, including but not limited to a website, an app (or other two dimensional environment), a video game, a virtual world, a simulation and the like. The virtual world may optionally be implemented through VR (virtual reality), AR (augmented reality), or may comprise a two dimensional environment (including but not limited to a website, an app and so forth) and the like. The VR environment may be supported through headgear (such as a head mounted display), glasses and the like. The AR environment may be supported by a mobile device, glasses and the like. The information may optionally be stored on a blockchain for security and non-falsifiability, for example to confirm that the virtual good is authentic.

Any suitable blockchain which involves a distributed ledger, which preferably requires some type of cryptography, more preferably a public/private key encryption system, or hash or digital signatures, may optionally be used. Once a change-such as acceptance of a sale of a virtual good—is made and is written to the distributed ledger, this change is automatically securely, non-falsifiably, that is completely accurately, replicated to all network participants.

The nature of the distributed ledger is such that all parties to a transaction can see the details of the transaction and optionally further requirements for the transaction to be complete.

Such a distributed ledger would also have the advantage of fraud prevention with immutable, append-only Distributed Ledger Technology. For example, users attempting to fraudulently trade cryptocurrency units that they do not possess would be blocked.

A blockchain or distributed ledger is a distributed database that maintains a list of data records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies such as used in bitcoin. The data records recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. Similarly, when multiple versions of a document or transaction exists on the ledger, multiple nodes can converge on the most up-to-date version of the transaction. For example, in the case of a virtual currency transaction, any node within the blockchain that creates a transaction can determine within a level of certainty whether the transaction can take place and become final by confirming that no conflicting transactions (i.e., the same currency unit has not already been spent) confirmed by the blockchain elsewhere.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, for example, when someone sends cryptocurrency to another person), and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the block-chain. For example, in the case of cryptocurrencies, a valid transaction is one that is digitally signed, spent from a valid digital wallet and, in some cases, that meets other criteria. In some blockchain systems, miners are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue creating new blocks.

Preferably the blockchain(s) that is/are implemented are capable of running code, to facilitate the use of smart contracts. Smart contracts are computer processes that facili-tate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart con-tracts are digital rights management (DRM) used for pro-tecting copyrighted works, buying or selling goods, whether virtual or physical, executing transfers of goods or of rights associated with such goods, and the like.

Smart contracts may also be described as pre-written logic (computer code), stored and replicated on a distributed storage platform (e.g., a blockchain), executed/run by a network of computers (which may be the same ones running the blockchain), which can result in ledger updates (transfer of digital rights, etc.).

Smart contract infrastructure can be implemented by replicated asset registries and contract execution using cryp-tographic hash chains and Byzantine fault tolerant replica-tion. For example, each node in a peer-to-peer network or blockchain distributed network may act as a title registry and escrow, thereby executing changes of ownership and imple-menting sets of predetermined rules that govern transactions on the network. Each node may also check the work of other nodes and in some cases, as noted above, function as miners or validators.

Not all blockchains can execute all types of smart con-tracts. For example, Bitcoin cannot currently execute smart contracts. Sidechains, i.e., blockchains connected to Bit-coin's main blockchain could enable smart contract func-tionality: by having different blockchains running in parallel to Bitcoin, with an ability to jump value between Bitcoin's main chain and the side chains, side chains could be used to execute logic. Smart contracts that are supported by side-chains are contemplated as being included within the block-chain enabled smart contracts that are described below. The term "blockchain" may also relate to an implementation involving one or more sidechains and/or bridges. Bridges connect blockchains, allowing the transfer of assets, infor-mation and tokens between them. They also support execu-tion of dapps and other functionality across blockchains.

For all of these examples, security for the blockchain may optionally and preferably be provided through cryptography, such as public/private key, hash function or digital signature, as is known in the art.

According to at least some embodiments, there is pro-vided a system to identify an authorized virtual good in a virtual economy, comprising a user computational device, said user computational device comprising a user device memory, a user display and a user device processor; a server in communication with said user computational device, said server comprising a server memory and a server processor; and a mark associated with the virtual good to permit the virtual good to be identified as the authorized virtual good, wherein each of said user device processor and said server processor is configured to perform a defined set of opera-tions in response to receiving a corresponding instruction selected from a predefined native instruction set of codes, said codes comprising a first set of machine codes selected from the native instruction set for receiving a request for identification of the virtual good; a second set of machine codes selected from the native instruction set for analyzing the request and for reviewing information to determine whether the virtual good has been identified according to said mark; and a third set of machine codes selected from the native instruction set to enable the virtual good to be accessed through said user computational device, once the virtual good has been identified; wherein each of the first, second and third sets of machine code is stored in the user device memory or in the server memory, and is executed by the user device processor or the server processor; the system further comprising a certification storage for storing identi-fication information, and wherein said server processor identifies said virtual good according to information retrieved from said certification storage; wherein said cer-tification storage stores a virtual good identifier and a plurality of parameters describing said virtual good.

Optionally said mark comprises an AMR (authenticated mixed reality) mark, and wherein said AMR mark is dis-played visually in a mixed reality environment such that said mark is visible through said display of said user computa-tional device. Optionally said mark is associated with an authorized producer of an equivalent physical good. Option-ally, said user computational device further comprises a user input device, wherein said user input device receives input commands, and said user device processor determines said identification of said virtual good according to an input request through said user input device. Optionally, said user device processor determines said identification of said vir-tual good according to an automatic request from said user computational device. Optionally, said user device processor causes identification information about said virtual good to be visually displayed by said display, including an associa-tion with an authorized producer.

Optionally, said user computational device comprises a VR headset and a VR console, wherein said VR console comprises said user device processor and said user device memory, and wherein said VR console causes identification information about said virtual good to be visually displayed by said VR headset, including an association with an autho-rized producer. Optionally, said certification storage com-prises a blockchain, wherein said identification information is stored on said blockchain. Optionally, said storage com-prises a blockchain implemented storage. Optionally, one or more transactions related to the virtual good are recorded in the storage. Optionally, said third set of machine codes selected from the native instruction set to enable the virtual good to be accessed through said user computational device, once the virtual good has been identified, further comprises a set of machine codes for reading information from said virtual good blockchain and for writing information to said virtual good blockchain in regard to a transaction for the said virtual good.

Optionally, said request for verification includes an identification of at least one computer system in which the virtual good may be used, and wherein said server processor executes at least one instruction to determine if said parameters indicate that a requested use is permitted according to said identification of said at least one computer system; and a sixth set of machine codes selected from the native instruction set to enable the virtual good to be accessed through said user computational device, if said requested use is permitted; wherein each of the fourth, fifth and sixth sets of machine code is stored in the user device memory or in the server memory, and is executed by the user device processor or the server processor.

Optionally, said at least one computer system supports a mixed reality environment, selected from the group consisting of a website, an app, a video game, a virtual world, a metaverse and a simulation. Optionally, said virtual world is implemented through VR (virtual reality), AR (augmented reality), or a two dimensional digital environment. Optionally, said AR environment is supported by a mobile device or glasses. Optionally, said at least one computer system comprises a plurality of computer systems supporting a plurality of mixed reality environments, which may be the same or different. Optionally, said server monitors usage of the virtual good across said plurality of computer systems.

Optionally, said mark, certificate or combination thereof identifies a plurality of different virtual goods and is associated with said parameters for said plurality of different virtual goods. Optionally, said server comprises an analysis engine to identify said mark in relation to said legitimate items, said analysis engine being operated by said server processor according to codes stored in said server memory; wherein said server processor further executes instructions to authenticate said virtual good. Optionally, said AR engine is operated by said user device processor according to codes stored in said user device memory, and said analysis engine determines said authentication of said virtual good according to an automatic request from said AR engine. Optionally, said VR console comprises said user device processor and said user device memory, and wherein said VR console causes branding information about said virtual good to be visually displayed by said VR headset.

Optionally, said server further comprises a certification engine operated by said server processor according to codes stored in said server memory, and a certification database for storing authentication information, and wherein said certification engine determines an authentication of said virtual good according to said certification database. Optionally, said authentication information is stored on said blockchain. Optionally, said codes for said certification engine comprise codes for identifying non-legitimate, "fake" or fraudulent items according to information stored on said blockchain.

The system as described herein, optionally further comprises at least one additional server to operate a plurality of mixed reality environment such as a virtual world, and wherein said information stored on said blockchain determines authenticity of said virtual good for said plurality of mixed reality environment such as a virtual world. Optionally, said storage comprises a blockchain implemented storage. Optionally, one or more transactions related to the verified item are recorded in the storage. Optionally, said license comprises a plurality of terms and wherein use of the virtual good within said mixed reality environment is determined according to said license.

Optionally, said server monitors a behavior of said virtual good in each mixed reality environment to determine whether said behavior complies with said terms of said license. Optionally, said processor of said server executes a plurality of instructions for creating an emulation of a virtual good, and for associating said emulation with a license; wherein said processor further executes instructions for monitoring a behavior of said emulation in said mixed reality environment. Optionally, if said behavior does not comport with said license terms, invalidating said emulation. Optionally, said processor of said server executes a plurality of instructions for creating a set of virtual goods, and for associating said set with a license; wherein said processor further executes instructions for monitoring a behavior of said set in said mixed reality environment. Optionally, said request for verification includes an identification of at least one computer system in which the virtual good may be used, and wherein said server processor executes at least one instruction to determine if said parameters indicate that a requested use is permitted according to said identification of said at least one computer system; and a third set of machine codes selected from the native instruction set to enable the virtual good to be accessed through said user computational device, if said requested use is permitted; wherein each of the first, second and third sets of machine code is stored in the user device memory or in the server memory, and is executed by the user device processor or the server processor.

Optionally, said at least one computer system supports a mixed reality environment, selected from the group consisting of a website, an app, a video game, a virtual world, a metaverse and a simulation. Optionally, said virtual world is implemented through VR (virtual reality), AR (augmented reality), or a two dimensional digital environment. Optionally, said AR environment is supported by a mobile device or glasses. Optionally, said at least one computer system comprises a plurality of computer systems supporting a plurality of mixed reality environments, which may be the same or different. Optionally, said server monitors usage of the virtual good across said plurality of computer systems. Optionally, said mark, certificate or combination thereof identifies a plurality of different virtual goods and is associated with said parameters for said plurality of different virtual goods.

Optionally, the virtual good has both an associated mark and an associated certificate, and wherein said associated mark is visible or is capable of being rendered as visible within said computer system. Optionally, said parameters associated with said mark, said certificate or both are stored on said blockchain, and wherein permission to access the virtual good is determined according to a smart contract executed through said blockchain, according to said parameters and according to said mark, said certificate or both. Optionally, said server comprises an analysis engine to identify said mark in relation to said legitimate items, said analysis engine being operated by said server processor according to codes stored in said server memory; wherein said server processor further executes instructions to authenticate said virtual good. Optionally, said user input device receives input commands, and said analysis engine determines said authentication of said virtual good according to an input request through said user input device.

Optionally, said AR engine is operated by said user device processor according to codes stored in said user device memory, and said analysis engine determines said authentication of said virtual good according to an automatic request from said AR engine. Optionally, said user computational device further comprises a display and said AR engine causes branding information about said virtual good to be visually displayed by said display. Optionally, said VR console comprises said user device processor and said user device memory, and wherein said VR console causes branding information about said virtual good to be visually displayed by said VR headset.

Optionally, said server further comprises a certification engine operated by said server processor according to codes stored in said server memory, and a certification database for storing authentication information, and wherein said certification engine determines an authentication of said virtual good according to said certification database. Optionally, said authentication information is stored on said blockchain. Optionally, said codes for said certification engine comprise codes for identifying non-legitimate, "fake" or fraudulent items according to information stored on said blockchain. The system as described herein, further comprising obtaining said virtual good by purchasing through a financial exchange.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

For example, any instruction or function as described herein could be described as being executed according to an instruction selected from a predefined native instruction set of codes, wherein the machine codes are stored on the memory associated with a computational device performing such an instruction, and executed by the computational device's processor. Any instruction or function as described herein may be associated with a computational device and hence to be executed by that device's processor.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodi-

Figure 1A:
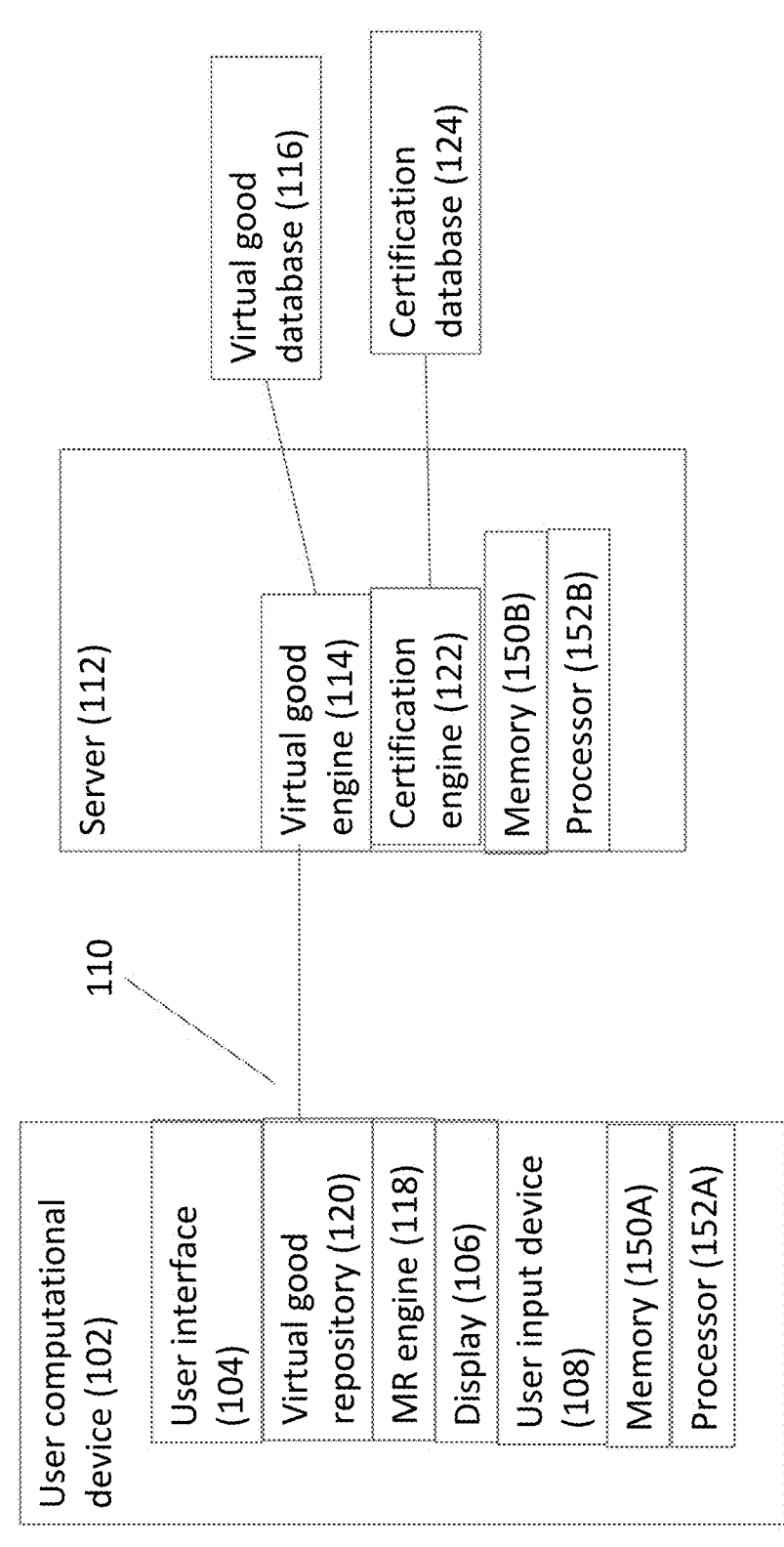
Figure 1B:
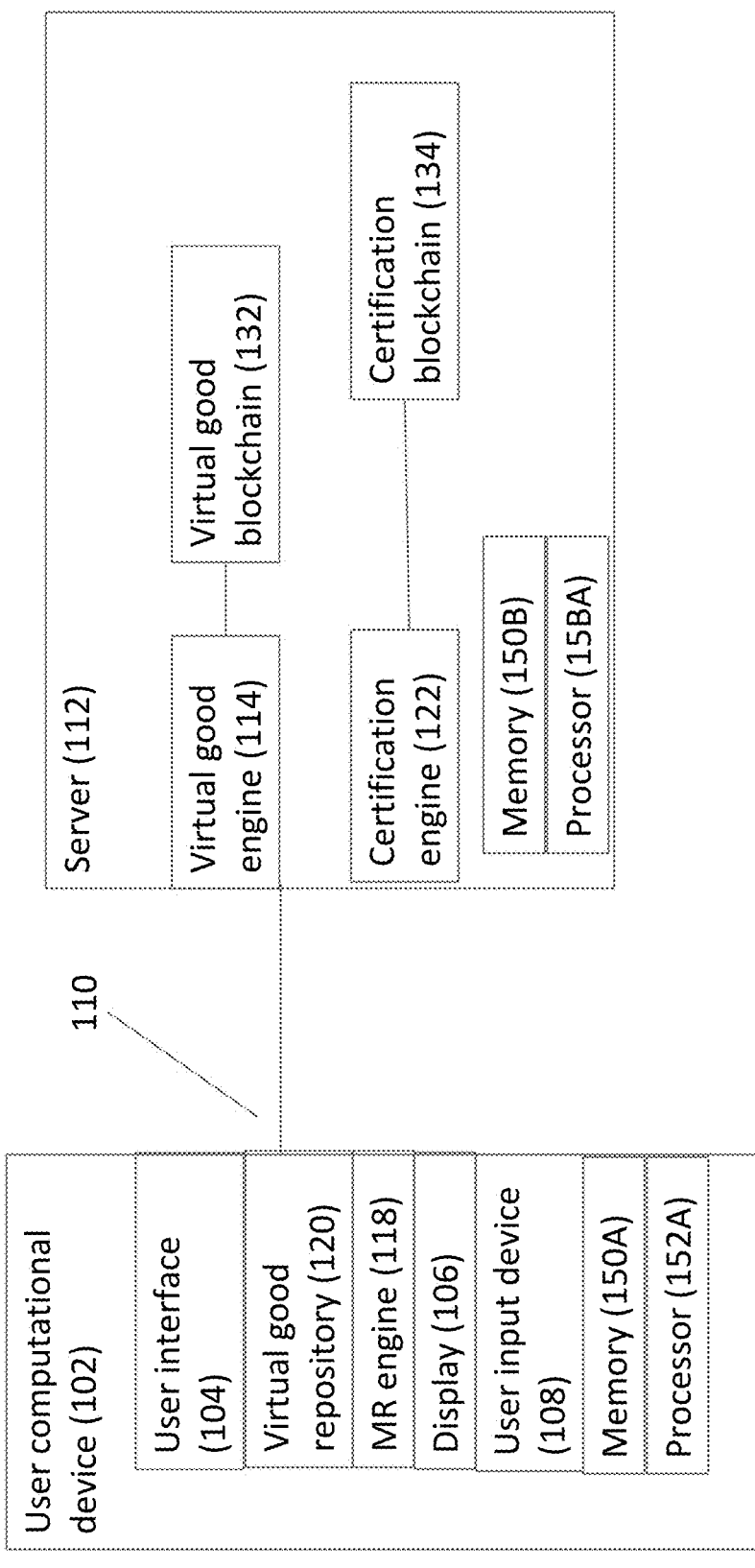
Figure 1C:
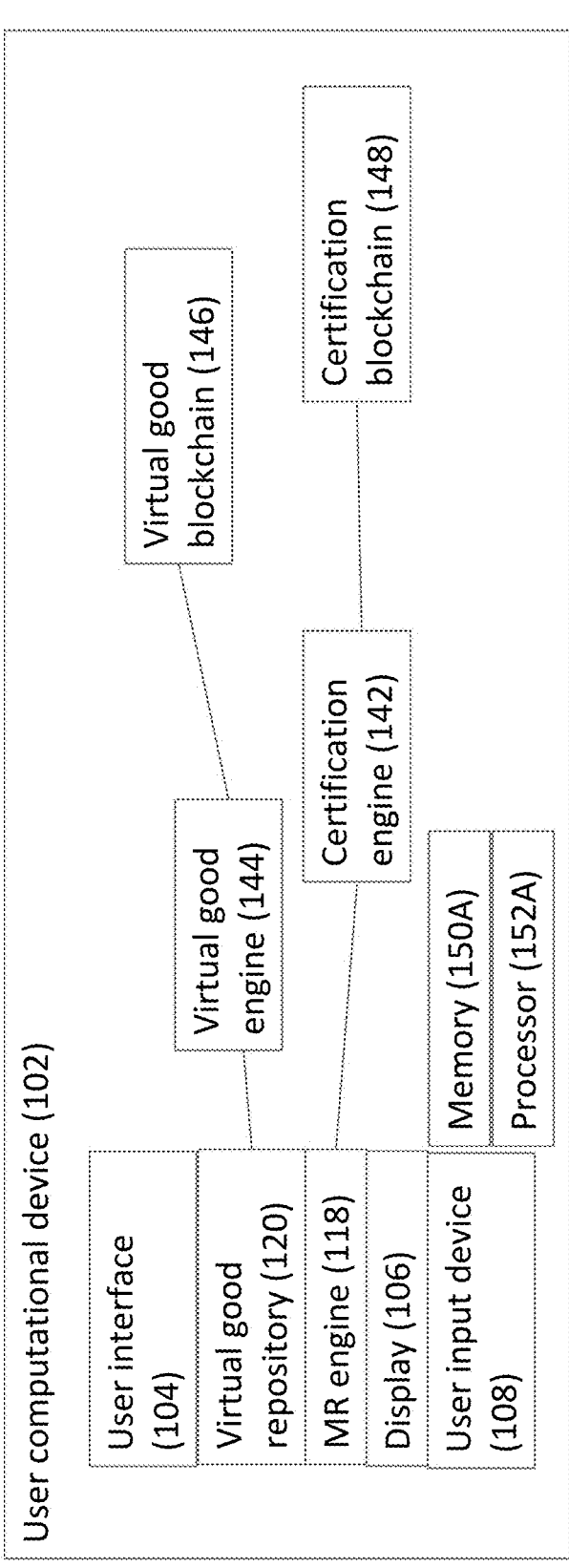
Figure 2:
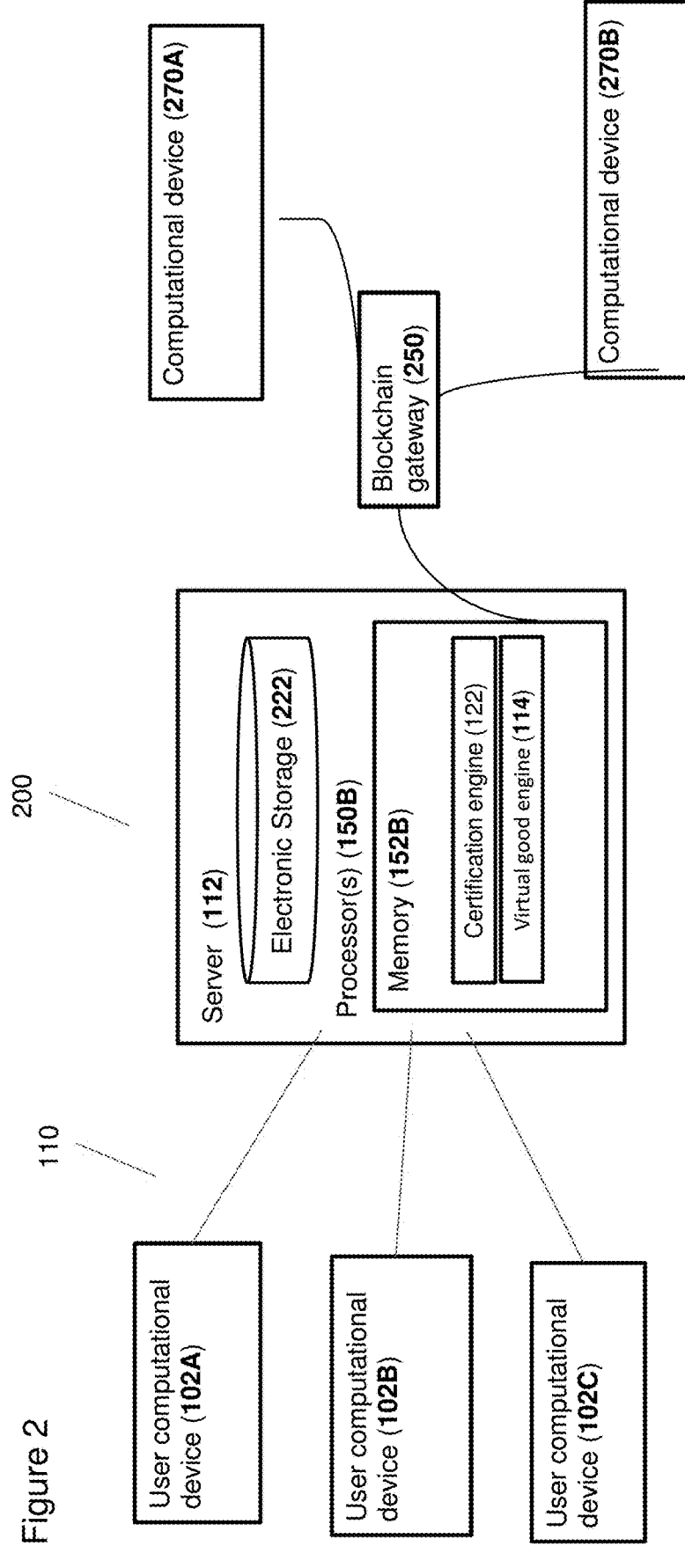
Figure 4A:
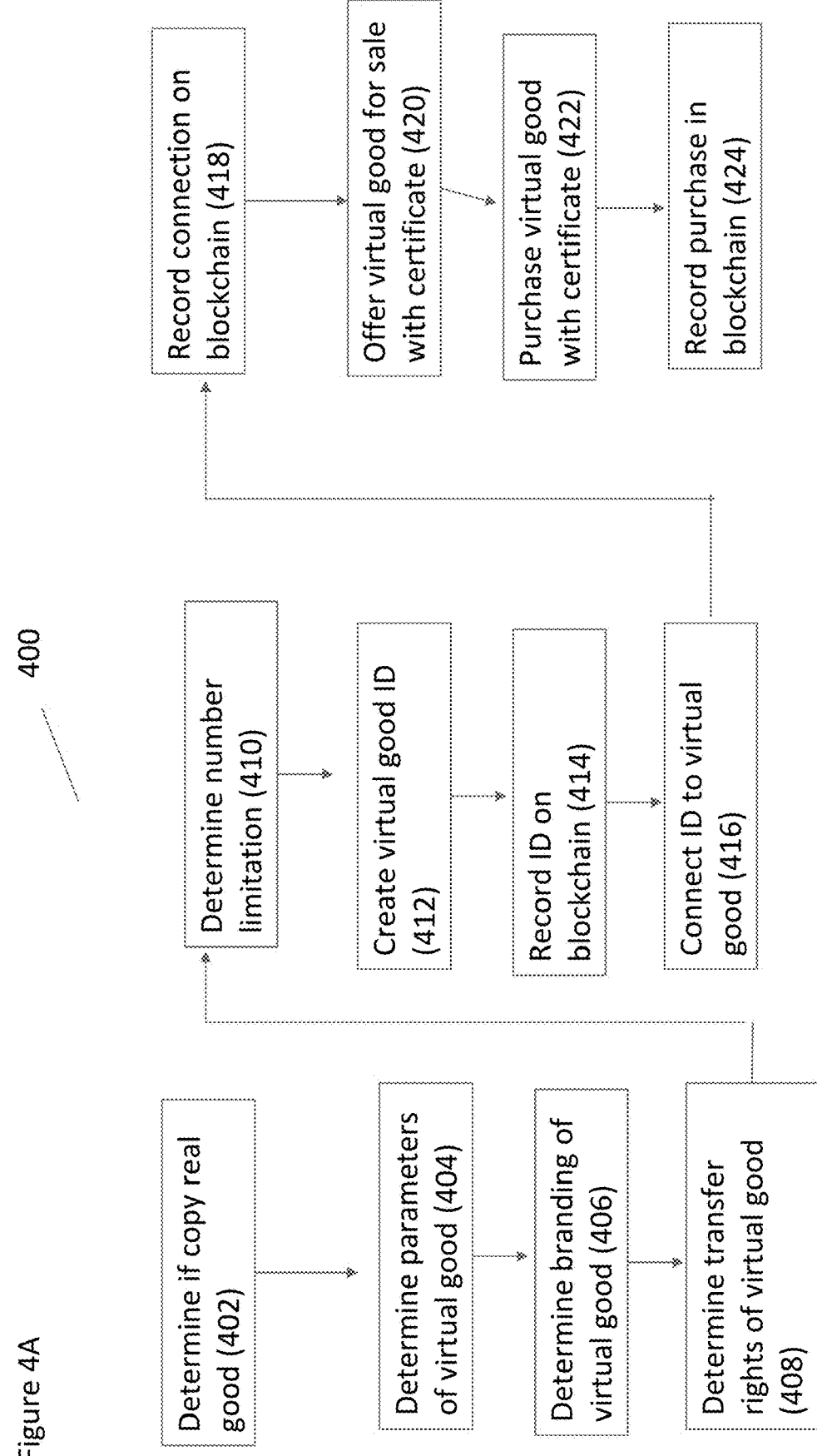
Figure 4B:
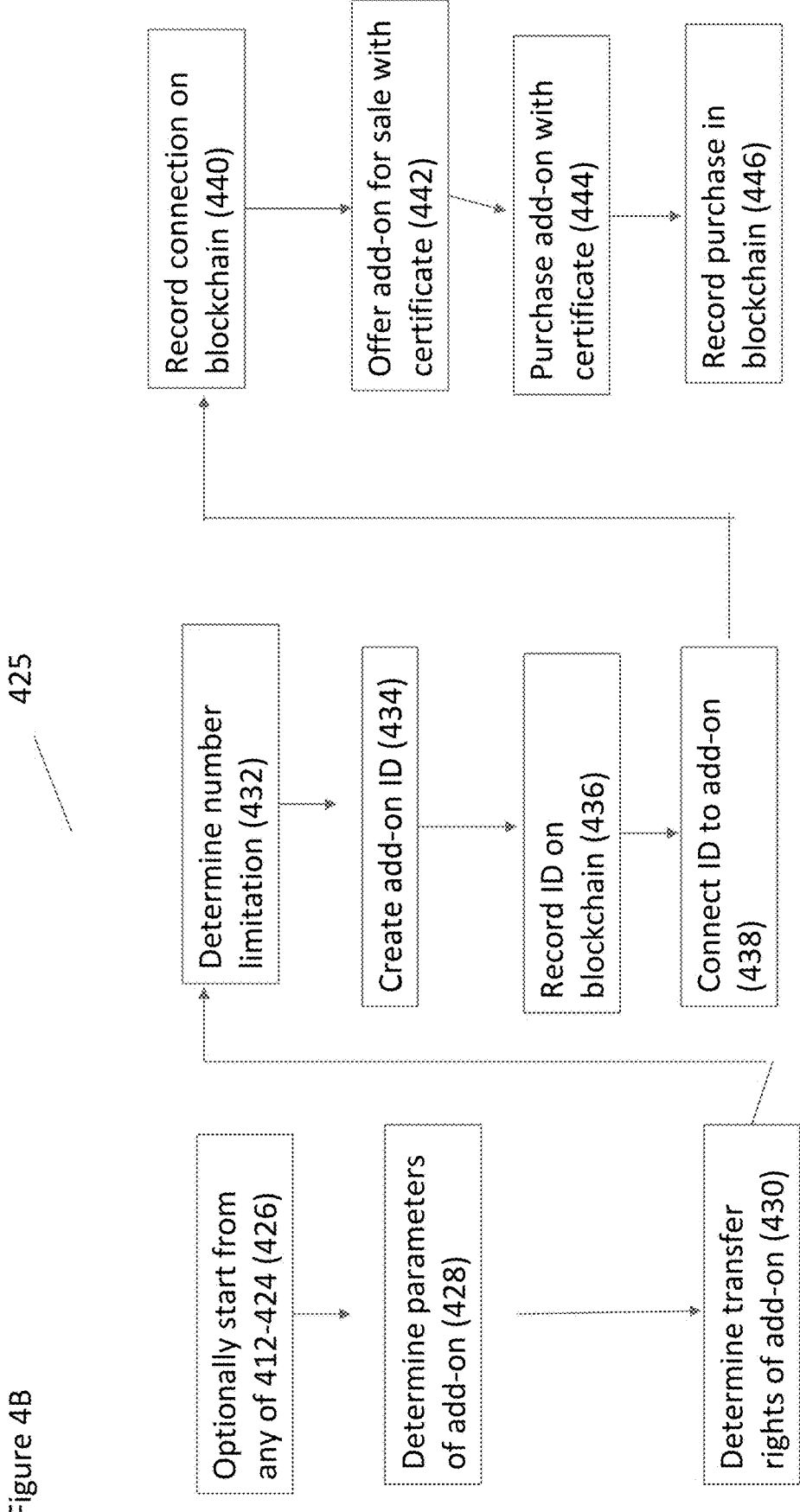
Figure 6:
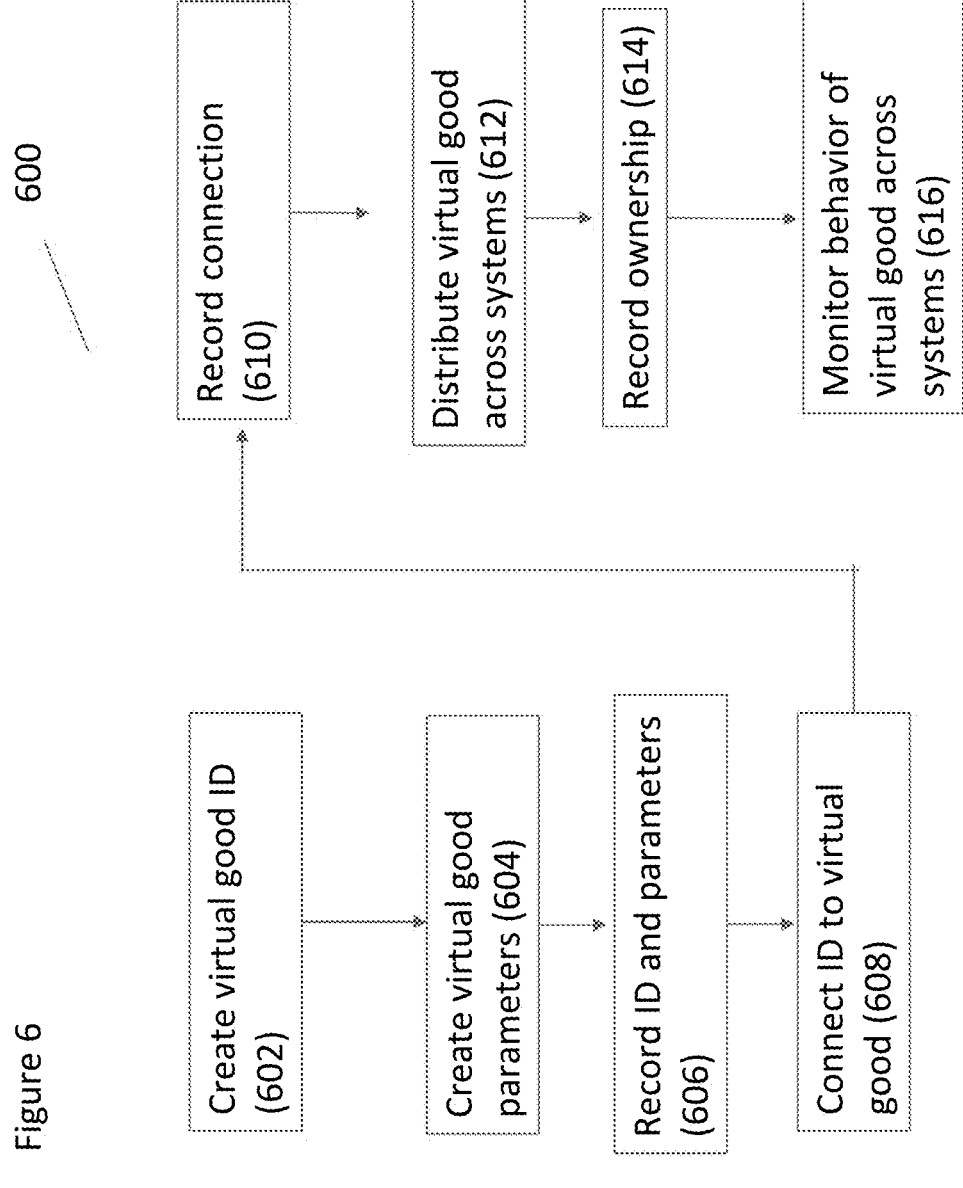
Figure 8:
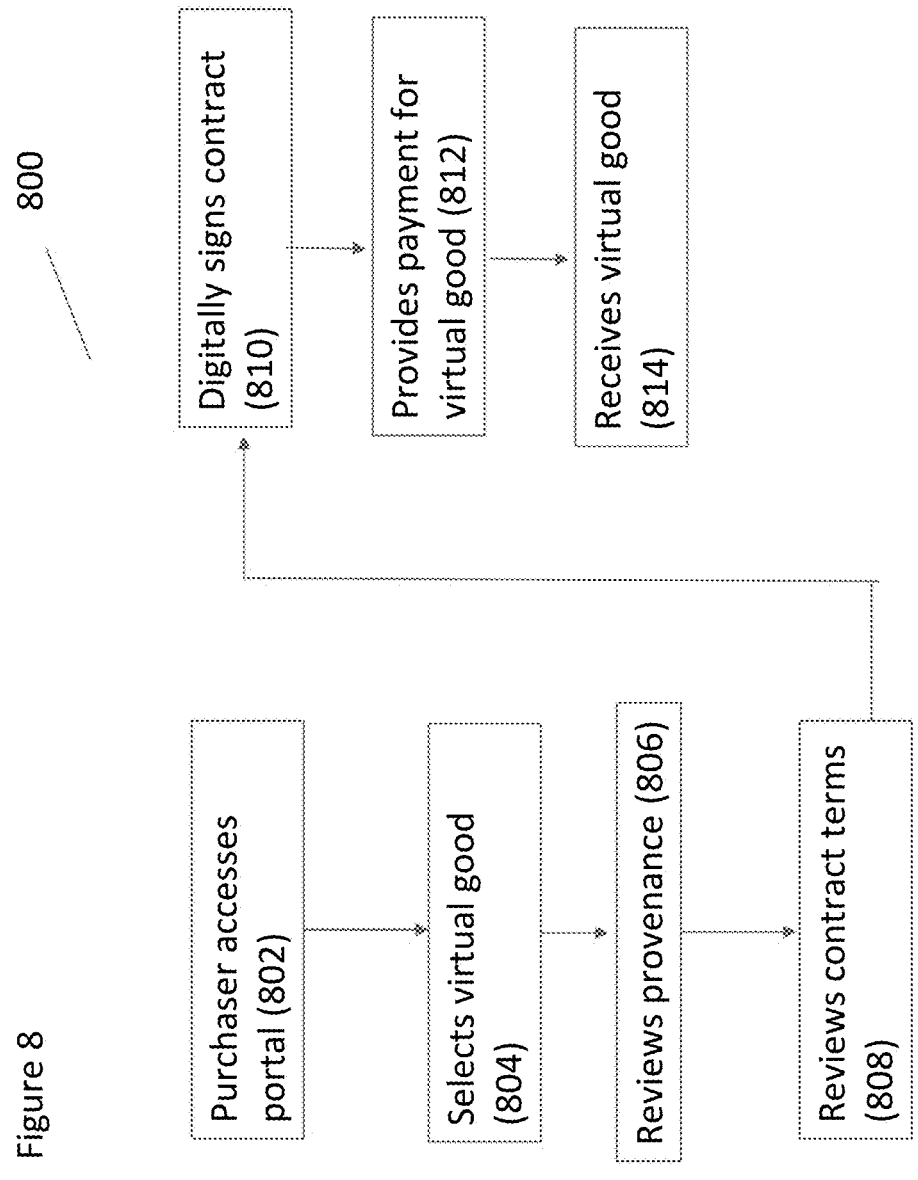
Figure 9:
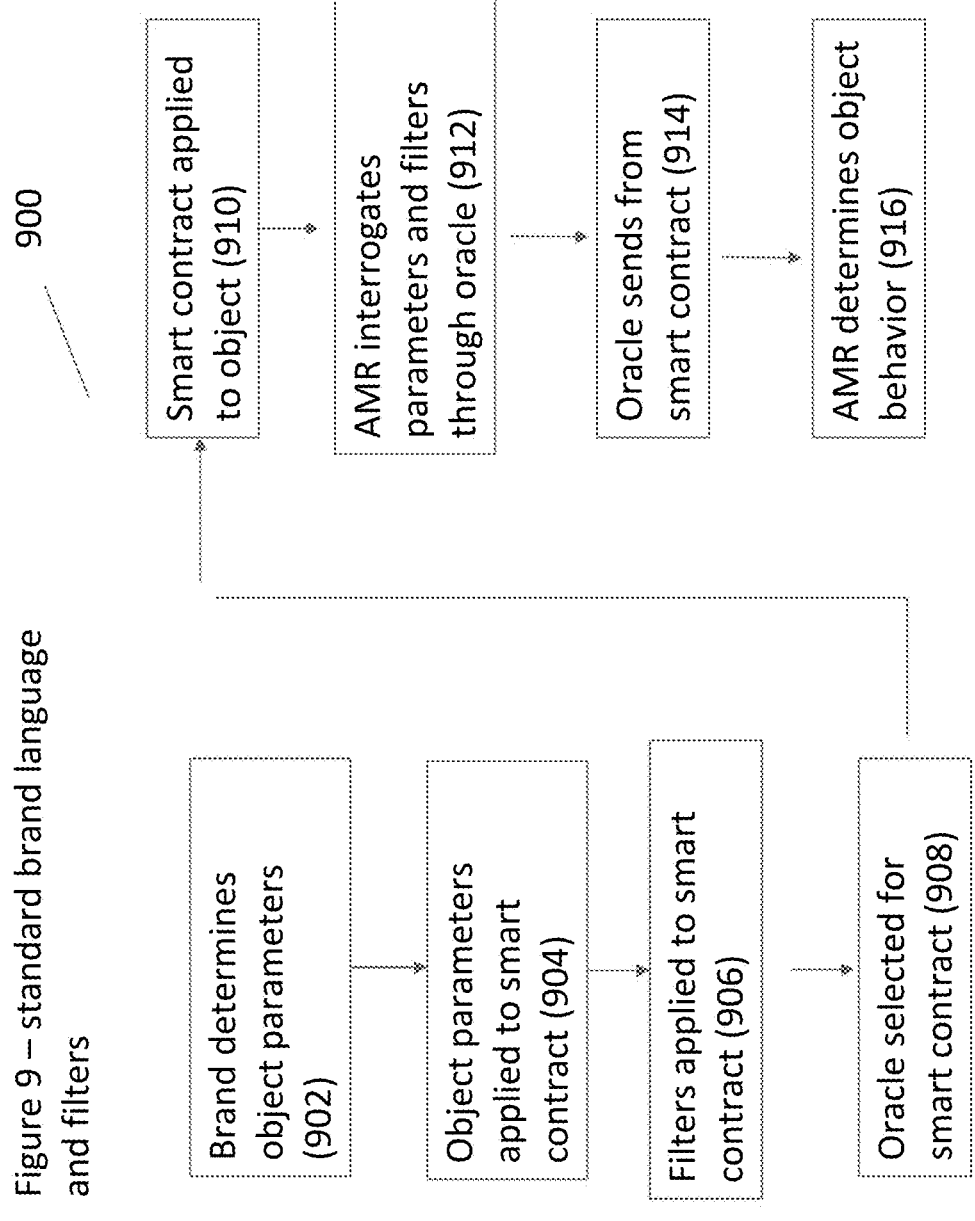
Figure 10:
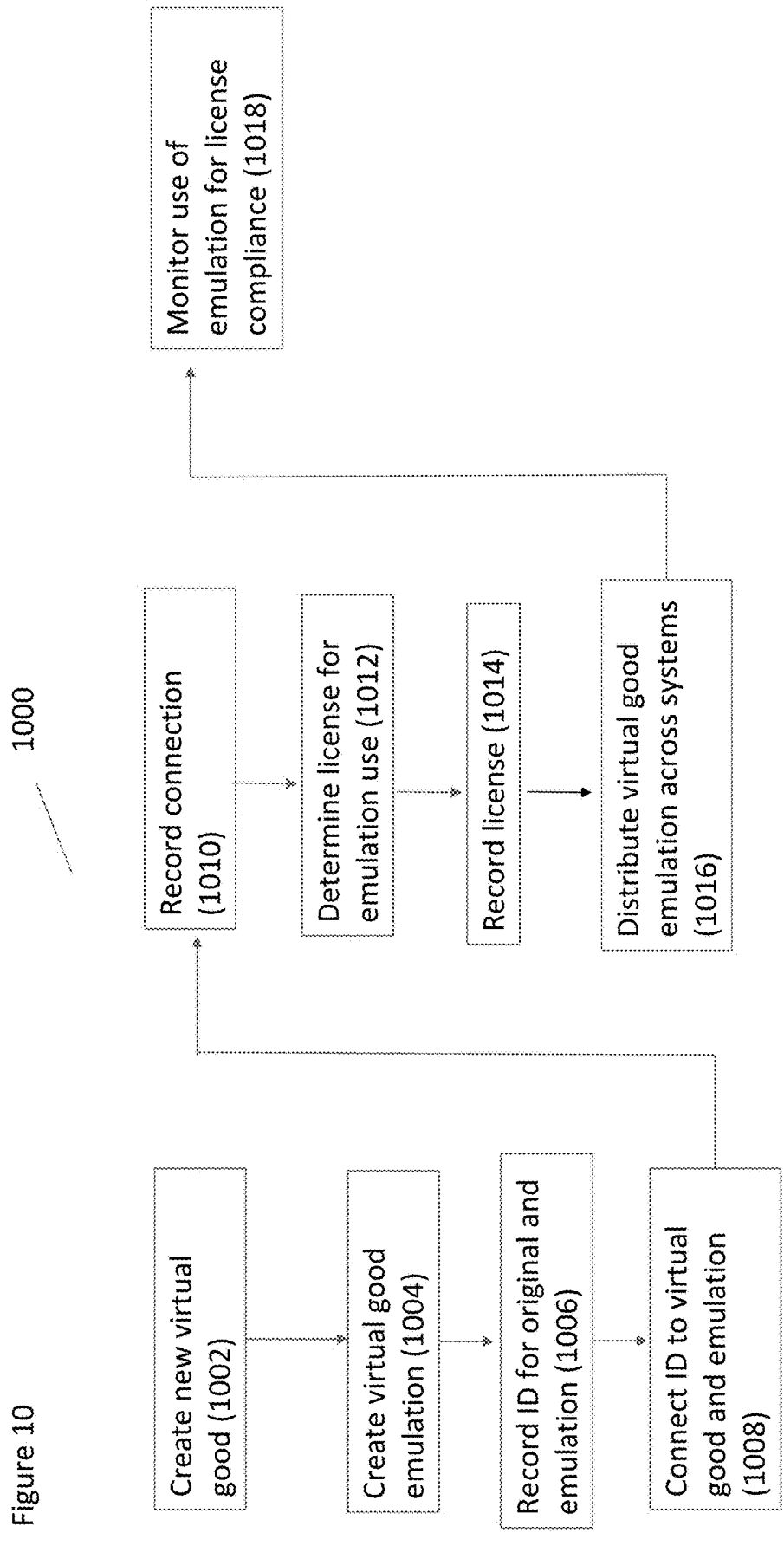
Figure 11:
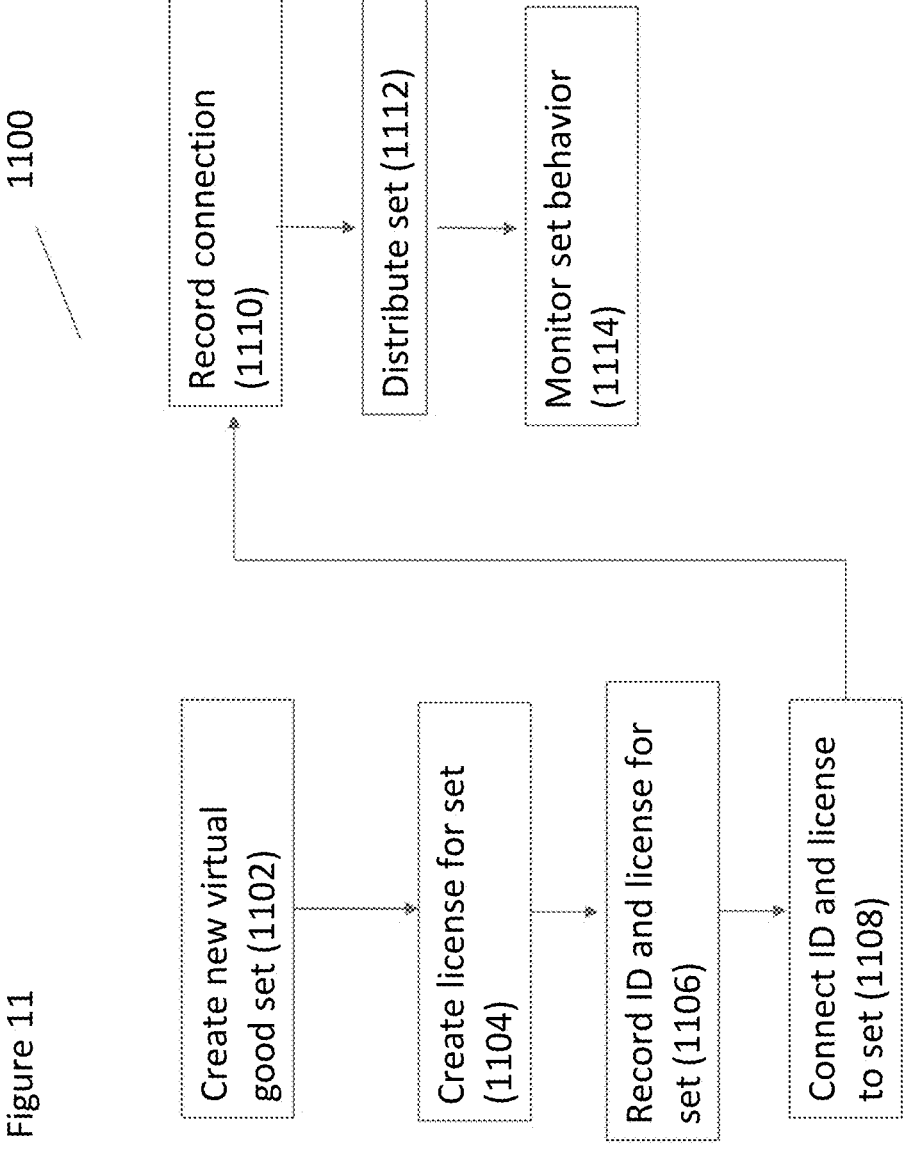

8 ments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 1A-1C show non-limiting, exemplary systems according to at least some embodiments of the present invention;

FIG. 2 shows a non-limiting, exemplary system for verification of authenticity and/or ownership of a virtual good across a plurality of computational systems;

FIGS. 3A-3C show non-limiting, exemplary methods for determining rights and characteristics of an object through a blockchain;

FIG. 4A shows a non-limiting exemplary method for determining how to create a mark for a virtual good and the virtual good itself;

FIG. 4B relates to a non-limiting exemplary method for creating an add-on for a virtual good;

FIG. 5 shows a non-limiting exemplary method for applying an object as a repository of value;

FIG. 6 shows a non-limiting, exemplary method for permitting a virtual good to be authenticated across a plurality of computer systems;

FIG. 7 shows a non-limiting, exemplary method for permitting a virtual good to be authenticated across a plurality of computer systems according to a license;

FIG. 8 shows a non-limiting, exemplary method for purchasing an existing virtual good in a mixed reality environment;

FIG. 9 shows a non-limiting, exemplary method for applying standard brand language and filters;

FIG. 10 shows a non-limiting, exemplary method for permitting a virtual good to be emulated across a plurality of computer systems according to a license;

FIG. 11 shows a non-limiting, exemplary method for authorizing a virtual good set in one or more mixed reality environments;

FIG. 12 shows a non-limiting, exemplary method for determining an extended chain of provenance;

FIG. 13 shows a non-limiting, exemplary method for applying a generative rule set for object;

FIG. 14 shows a non-limiting, exemplary method for a built-in emulator;

FIG. 15 shows a non-limiting, exemplary method for an external emulator;

FIG. 16 shows a non-limiting, exemplary method for entering an object to an AMR;

FIG. 17 shows a non-limiting, exemplary method for a brand to determine a mark authorization system;

FIGS. 18, 19A-19C, 20 and 21 relate to exemplary, non-limiting embodiments of an authentication system; and FIG. 22 relates to a non-limiting, exemplary method for a digital twin.

DESCRIPTION OF AT LEAST SOME EMBODIMENTS

As humans spend increasingly longer periods of time online, there is an increasing desire for richer digital environments. These digital environments are becoming more immersive and three dimensional. Some environments, termed "virtual worlds" or "the metaverse", even require special headsets to provide a completely immersive experience, which seeks to replicate the "real world", physical environment.

Such environments, by necessity, are also becoming increasingly complex. They require many more objects, for example, to replicate the physical environment. Creators of such digital objects want to be able to determine the extent to which these objects are copied, shared, and transferred between environments. However, managing rights, permissions and restrictions around digital object behavior is very difficult with traditional tools. Furthermore, buyers want to know that they are purchasing an authentic digital object, and not a fake.

Rather than attempting top-down control of each digital object, creating objects that have built-in rights, permissions and restrictions may help to increase efficiency of both object management and also deployment to virtual environments. Such objects are independent and authenticated by the creator and/or brand that is responsible for them. These objects may also be considered to have "object sovereignty". Preferably, these objects operate in an authenticated world. The presently claimed invention assists with this process by providing automatic mark management, which both reduces friction while also maintaining control by object creators and/or brands. Such objects may both act independently while being authenticated, untethering them from micromanagement by a brand/creator. As a non-limiting example of a mechanism for supporting such independent yet controlled objects, guidelines for an object's behavior may be imbued into the object's smart contract, which is then stored on a blockchain. Other verification mechanisms may be used of course, including both centralized and decentralized mechanisms, and are contemplated within the present invention.

As another non-limiting example, online objects such as online content may also be granted permissions for specific uses. For example, generative AI and other large AI models require enormous amounts of data. Reddit, Twitter and other companies have decided to either start charging for access (Reddit) or to increase the amount charged for access (Twitter). Valuable user-generated data may be managed as a digital object with certain rights and permissions, as well as with restrictions.

As another non-limiting example, the behavior of digital twins (digital representations of real world, physical objects) may also be so governed. Such governance may be applied to prevent misuse or abuse of such digital representations. For example, a brand owner may not wish to have their brand identifiers (trade dress) and/or branded objects appear in a negative scenario in a video game. As another example, an artist may wish to control the number of digital copies that can be made of a particular artwork; if the work in question is owned by a museum, then the artist may cooperate with the museum to create an official, limited number of digital copies of the work. These copies may then be numbered (1 of 500, etc.) and marked with an authentication mark for both the artist and the museum.

Additionally, the behavior of the digital twin may be linked to that of the physical object. For example, if the physical object is an office building with lights, when these lights are turned on in the real world object, the lights could also go on in the digital twin virtual object.

The present invention, in at least some embodiments, may enforce the behavioral guidelines for the digital twin through a decentralized and no-trust based contract, and enforcement mechanism, such as the previously described example of the smart contract.

The rights, permissions and restrictions around digital object behavior may also be supported through object-platform negotiation of emulation and behavior. As described in greater detail below, emulations and other supportive interfaces enable objects to enforce their rights, permissions and restrictions for behavior on a platform, as well as enabling the platform to enforce its own rights, permissions and restrictions on the behavior of the object. This automated two-way enforcement mechanism enables the needs of all sides to be met-including the digital object owner, the creator/brand owner and the platform.

Optionally, such emulations may also be applied to protect the object, for example by making it impossible to disfigure, or cause damage to the object (or brand) by a hacker. Such an implementation is particularly important in an untrusted environment and/or an environment that is not controlled by the digital object creator and/or brand owner.

Optionally, behavior of the object may also be monitored and/or controlled to add additional rights or permissions, optionally to control interactions in specific environments. Non-limiting examples of such interactions include cultural affirmation and cultural rules of behavior, brand guidelines of behavior, interactions with competitor brands and interactions with other digital objects. Optionally an object may have different rules or other determinants of behavior in different AMR environments, which may optionally form part of the emulation negotiation between the object and the environment.

Such virtual goods may optionally be authenticated, and also optionally provided, through a certification system for virtual products. Such a certification system may be used to maintain the value of such virtual goods or products, in regard to their brand, other identity and/or to maintain their value in relation to their physical counterparts. A "certificate" in this regard may comprise a mark or other indication of authenticity and/or authorized ownership, license and/or other use.

The certification system may operate by using blockchain technology for data storage and retrieval, and optionally also for smart contracts and other features for automatic or automated transaction implementation. As a non-limiting example, such virtual goods may be those displayed in an AR (augmented reality) or VR (virtual reality) environment. For the sake of discussion only and without intending to be limited in any way, the use of such a mark is described herein with regard to an AR environment in certain figures and in regard to a VR environment for other figures. Furthermore, the virtual goods may be displayed in a mixed reality environment, which is preferably an authorized mixed reality environment. A mixed reality environment comprises any suitable virtual environment, which is accessible through a suitable platform. As a non-limiting example, such a platform may comprise a mobile device such as a smartphone, a headset, special glasses or goggles, and the like, or a combination thereof. The mixed reality environment may also comprise a two dimensional computational environment, such as an environment accessible through a web page or other mark-up language document interface. An "authorized" mixed reality environment preferably features one or more authorization functions or features, more preferably accessible to and/or controlled by an authorized brand owner, user, licensee and the like.

For visual reference to certify this authenticity, a visual mark can be used. Optionally the mark is visible to a user part or all of the time. Optionally, such a mark is readable by a computer system. If the mark is computer readable, optionally and alternatively, the mark remains not visible to the user, part or all of the time. Without wishing to be limited in any way, optionally the mark may be termed an AMR (authenticated mixed reality) mark. The AMR preferably supports non-copy-ability for items to retain value and proof of ownership to allow for buying and selling of such virtual items.

The mark may be displayed continuously or periodically. If displayed periodically, optionally the mark is displayed upon request, for example when purchasing a virtual good, transferring a virtual good, for verification upon use of a virtual good within a mixed reality environment such as a mixed reality environment such as a virtual world, and so forth. The request may be made by the owner, another user, a brand owner, an operator of a mixed reality environment such as a mixed reality environment such as a virtual world, and so forth.

The certification enables virtual goods to be determined as being authentic, for example as actually belonging to a particular brand, being licensed by that brand and/or otherwise being authorized by that brand. A visible mark may give assurance to the user. A computer readable mark enables such assurance to extend to a review of the certification that is external to a particular device, further increasing the assurance that a particular virtual good is related to the specific brand. The mark may form part of an associated certificate that is associated with the virtual good.

Because virtual products are made using different skill sets than their physical counterparts, and duplicates can be made instantly and with low effort, brand quality and messaging play an oversized role in retaining value between mediums. For luxury and parody products that rely on branding for added value, a virtual version of that product needs authorization from that brand to carry that value. A visual mark gives top level assurance while back-end blockchain code can present un-copyable assurance of its origin while at the same time tracking its usage in the mixed reality environment such as a virtual world even when that object is being used outside of virtual spaces controlled by the brand itself.

For instance, when experiencing an augmented or virtual version of a branded object at a virtual property controlled by that brand, such as a website or app, one is guaranteed to be using that brand's authorized virtual version. But if that virtual object is made available in an environment that is not controlled by the brand, such as a role playing VR game or an AR advertisement, other parties will be involved that can't guarantee authenticity.

This problem of authentication and certification will be particularly acute in the future, as users purchase virtual objects with real world (non-virtual) money. Such virtual products will carry more and more real value. For brands with brand value on physical objects to carry over into these mixed reality environments such as a virtual world, they need this kind of authentication. The added benefit of using blockchain for authentication is also that its use becomes trackable and therefore monetizable. Regardless of where a virtual object goes, the original creator is preferably then compensated for its use with no central authority or trust required. With the trust of authenticity built right into the virtual object, the digital world solves the problem of unauthorized copying. Additionally, the places these objects go, the experiences they are a part of, and the people/avatars these objects interact with may become a part of their immutable provenance which not only adds to their value, but changes the perception of those who later interact with these objects if those experiences are made a part of the user experience as the mark makes available.

Examples today include video games like racing car games that use multiple-brand racecars. These deals currently take months of negotiations and teams of lawyers. As augmented and virtual realities become more popular, these scenarios and deals will become much more frequent. With a mark as described herein, preferably through a blockchain implementation as described herein, these deals can be negotiated without a need for a central authority and enjoy the benefit of an industry accepted set of rules. Analogous physical object examples may also include signed collector cards, certificates of authenticity, signatures of artists on the object and media that prove an object was a part of an event, such as an instrument played at a concert.

Furthermore, such a marking system, which optionally supports automatic transactions between a first party wishing to license a virtual good or brand owned by another party, would further support micro or smaller transactions. A creative commons license could therefore optionally include such a small transaction, rather than being free, for example. In addition, such a system would prevent unauthorized representations of branded or copyrighted works, including abusive representations. The mark may also counter cultural appropriation with proof of authenticity and permission from a recognized cultural authority, as cultural leaders/representatives can seal approval into a mark as well as imbue rules of behavior into the mark and emulated versions of the object, and/or rules of copying, spawning, renting, and using.

Optionally, the virtual good is a virtual representation of an actual good, such as a luxury good for example. The virtual good may also relate to existing products that create augmented extensions of their products, non limiting examples of which include floating accessories above watch faces, making virtual designs on branded products, and/or by adding some type of mark such as a brand symbol for example to unlock functionality in the virtual world, for example through an image obtained by a camera.

Optionally, proof of ownership may relate to one or more of a physically centralized recorded proof, including but not limited to title, deeds, birth certificates, and so forth; a partially digital proof such as blockchain recorded titles, deeds and birth certificates; or a fully digital proof such as an email addressed, owned/controlled URL, soulbound tokens, Worldcoin, or other chain created proof of identity and/or ownership. Soulbound tokens are a non-transferrable form of NFT (non-fungible token), linked to a specific individual, which may be used for example to represent social identity online. Worldcoin is another proposed online identity solution.

As described in greater detail below, optionally the AMR may support the existence and/or transfer of virtual products across platforms. For example a character or a virtual good in World Of Warcraft can now live in Fortnight or Minecraft. Such a transfer or multi-platform existence can also be controlled by the brands the video games use on their platforms, and/or customized by the user. With current technologies, Fortnight's parent company Epic, and Minecraft's parent company Microsoft would have to have platform-compatible deals to allow interoperability. The mark's separate chain may allow for a compatible emulation for an environment based on communication between the mark's smart contract and the platform's requirements. Such a system may permit platform permission with objects, not platform deals with other platforms, which may keep the power of negotiation in the object's/owner's hands.

Another non-limiting example would be to control the use of brands, brand marks and branded items, whether based upon a real world physical object, within an AR or VR experience, and/or a mixed reality environment such as a virtual world. For example, the AMR may be used to prevent the unauthorized use of a brand name, logo, image, appearance and the like. For example, a user may be tempted to put homemade virtual versions of objects into stories. The AMR may be used to control such unauthorized activity instead, so that the user instead pays for the license from the original creator. An AMR mark (which may be visible only when needing proof so as not to interrupt the flow of the experience) would show that it was legally an authorized use of the virtual good, brand, brand appearance, brand marks, branded items and the like.

If an artist creates a new work of virtual art, that is to say, art for a mixed reality environment such as a virtual world, and/or for an AR or VR experience, the AMR may be used to mark this work of virtual art to permit control by the artist. The mark may be a brand, a signature, or other signifier of authenticity. The AMR may then be connected to a blockchain entry, to permit transfer of the work of art, create/copy and paste/spawn a limited number of copies for sale, as well as display its provenance and value over time.

Optionally, a created object may be changed after creation, by the creator and/or brand owner, or optionally by the current owner or possessor. Optionally such changes may relate to updating rules about an object's behavior, i.e. how it should emulate in different environments. Other such changes may include but are not limited to changes in the object's appearance (for example if brand colors change) and/or changes caused by a new collaboration or other licensing agreement. Such changes may be made by updating smart contracts for example, or other records on the blockchain, by adding blocks for an immutable digital ledger, or by making changes to a central database. Optionally ownership rights affect any such potential changes.

Optionally, each such copy is associated with the original mark (from the original object) or, additionally or alternatively, with a new version of the mark. If a new version of the mark is associated with the copy, then that new version of the mark is preferably associated with the initial mark, and optionally also with subsequent versions of the mark, for example in a linked chain.

If the copy comprises a change or mutation to the original, then it forms a mutable copy. The mutable copy is then preferably associated with the new version of the mark, which may then be associated or linked with previous versions of the mark as described above.

Turning now to the drawings, there is shown in FIG. 1A an exemplary non-limiting system for providing and examining virtual good certifications, according to at least some embodiments of the present invention. A system 100 features a user computational device 102 in communication with the server 112 through a computer network 110, such as the internet for example. User computational device 102 operates a user interface 104, which enables the user to interact with an AR engine 118 and a virtual good repository 120.

As used herein, a "user interface" 104 generally includes a plurality of interface devices and/or software that allow a customer to input commands and data to direct the processing device to execute instructions. For example, the user interface may include a graphical user interface (GUI) or an interface to input computer-executable instructions that direct the processor to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other customer input/output device for communicating with one or more users.

Information is displayed to the user through a display 106, which may optionally be a touch screen for example, in which case display 106 is optionally combined with a user input device 108. User input device may also additional and alternatively comprise one or more further input devices, including but not limited to a keyboard, a mouse, or other pointing device, and the like.

The user is preferably able to interact with the virtual goods, which are displayed by AR engine 118. As noted previously, the mixed reality environment being accessed may comprise any authorized mixed reality environment, as opposed to being solely an AR environment. The term "AR engine" is used herein for brevity. The virtual goods are preferably stored in virtual good repository 120, which may optionally also feature wrapper software, for example, to assist in determination of the authentication of certain goods and also to optionally cause a visual mark to be displayed if a virtual good is in fact certified.

Server 112 operates a virtual good engine 114 and a certification engine 122. Virtual good engine 114 is in communication with a virtual good database 116. Virtual good engine 114 takes information from virtual good database 116 and may optionally transmit it to virtual good repository 120. For example, such a transmission may optionally be performed when a virtual good is purchased to be stored in virtual good repository 120.

When a virtual good is to be certified, optionally a certification is invoked through user interface 104 or alternatively, by one or both of AR engine 118 and virtual good repository 120. Next, a request for authentication is preferably sent to virtual good engine 114, which may optionally retrieve an identifier of information from virtual good database 116.

Certification engine 122 then performs certification with regard to a certification database 124, for example, by determining whether the virtual good identifier in question has actually been certified, and/or otherwise determining whether or not the virtual good has been certified. Optionally certification engine 122 may determine whether an associated certificate exists for the virtual good and if so, whether such a certificate is authentic. Optionally, virtual good repository 120 or AR engine 118 are in direct contact with certification engine 122 in order to perform the certification process.

Optionally, AR engine 118 and/or virtual good repository 120 may only enable a virtual good to be shown, displayed, interacted with or otherwise provided to the user through user computational device 102 after certification has been performed through certification engine 122, and certification has been verified.

User computational device 102 also preferably features a memory 150A and a processor 152A. As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Processor 152A is configured to read codes from memory 150A, in order to perform the various functions of user computational device 102 as described herein. Through reading such codes, processor 152A is configured to perform a defined set of operations in response to receiving a corresponding instruction selected from a predefined native instruction set of codes. These codes comprise: a first set of machine codes selected from the native instruction set for receiving an input request through user input device 108 or as an automatic request from AR engine 118 or user interface 104, for verification of a virtual good, for example in regard to whether the good is fraudulent or "fake", or alternatively has been authenticated. A second set of machine codes is selected from the native instruction set for analyzing the request and for reviewing information to determine whether the virtual good has been authenticated, for example according to information provided by server 112, for example through certification engine 122. A third set of machine codes selected from the native instruction set enables the virtual good to be accessed through user computational device 102, for example for use in a mixed reality environment such as a virtual world, once the virtual good has been authenticated. Each of the first, second and third sets of machine code is stored in the memory 150A.

Server 112 also preferably features a memory 150B and a processor 152B. Processor 152B is configured to read codes from memory 150B, in order to perform the various functions of user computational device 102 as described herein. Through reading such codes, processor 152B is configured to perform a defined set of operations in response to receiving a corresponding instruction selected from a predefined native instruction set of codes. These codes comprise: a first set of machine codes selected from the native instruction set for receiving a request for verification of a virtual good, for example in regard to whether the good is fraudulent or "fake", or alternatively has been authenticated. Such a request may be received through user computational device 102 as previously described, or from a different computational device (not shown), such as that of a mixed reality environment such as a virtual world operating server for example.

A second set of machine codes is selected from the native instruction set for analyzing the request and for reviewing information to determine whether the virtual good has been authenticated, for example according to information provided by certification engine 122, reading data from certification database 124. A third set of machine codes selected from the native instruction set enables the virtual good to be accessed through user computational device 102, for example for use in a mixed reality environment such as a virtual world, once the virtual good has been authenticated, or for changes in ownership and other information to be recorded in a virtual good database 116. Each of the first, second and third sets of machine code is stored in the memory 150B.

FIG. 1B shows another exemplary non-limiting implementation of a system for certifying virtual goods, according to a least some embodiments of the present invention. As shown in a system 130, again, user computational device and server 112 are present, as is computational network 110. Reference components having the same numbers have the same or similar function.

In this case, user computational voice 102, again, operates the previously described components, softwares, and devices. However, in this case, rather than a virtual good database, virtual good engine 114 is in connection to a virtual good blockchain 132. Such a connection may comprise a direct connection to a blockchain node, including reading from and writing to such a node; and/or an indirect connection, mediated by a blockchain service or platform. Throughout the specification, the term "blockchain" may also comprise one or more of these implementations. Data is written to and read from virtual good blockchain 132, which provides a record of all the transactions involved from the virtual good. These details include, for example, how it was manufactured, who manufactured it, how much it cost, who purchased it originally, and optionally, any other further buyers and sellers along the chain.

Data is stored and managed using blockchain technology. Optionally, the blockchain can run code. As is known in the art, blockchains can perform more complex operations, defined in full-fledged programming languages. However, it is not a requirement for the blockchain to run code in order for the present invention to be implemented. Optionally only a distributed ledger is required, in which information is written that is securely available to all parties through cryptographic access to the distributed ledger.

According to at least some embodiments the blockchain is optionally a public or permissionless blockchain, such as Bitcoin or Ethereum, which is decentralized and which is a blockchain that anyone in the world can read, anyone in the world can send transactions to and expect to see them included if they are valid, and anyone in the world can participate in the consensus process for determining what blocks get added to the chain and what the current state is. As a substitute for centralized or quasi-centralized trust, public or permissionless blockchains are secured by cryptoeconomics—the combination of economic incentives and cryptographic verification using mechanisms such as proof of work or proof of stake.

Alternatively and optionally, the blockchain is a consortium blockchain, such as Hyperledger, where the consensus process is controlled by a pre-selected set of nodes, which for example may optionally be provided or supported by financial institutions and/or by an international consortium of conservation and development organizations. Such a blockchain is partially decentralized.

Optionally, the Hyperledger Fabric blockchain framework implementation is used (details are provided in "Architecture of the Hyperledger Blockchain Fabric" by Christian Cachin, IBM Research-Zurich, July 2016). It is one of the Hyperledger projects hosted by The Linux Foundation. Intended as a foundation for developing applications or solutions with a modular architecture, Hyperledger Fabric allows components, such as consensus and membership services, to be plug-and-play. Hyperledger Fabric leverages container technology to host smart contracts called "chaincode" that comprise the application logic of the system. This framework also includes such features as:

Channels for sharing confidential information

Ordering Service delivers transactions consistently to peers in the network.

Endorsement policies for transactions.

CouchDB world state supports wide range of queries

Bring-your-own Membership Service Provider (MSP)

If the blockchain is private or permissioned—that is, centrally controlled by an operating entity to authorize participation-then optionally all members of the system as described by the present invention which need access are provided with cryptographic access, and become members of the private or permissioned blockchain system, such as Hyperledger.

Hyperledger has its own set of protocols and consensus process, which may optionally be used with smart contracts, to prevent fraud through providing the same asset (invoice) more than once for financing.

One of ordinary skill in the art could easily select a distributed ledger and implement it within various embodiments of the present invention, for example according to information provided in "Blockchain Basics: Introduction To Business Ledgers" by Brakeville and Perepa, IBM, May 9, 2016.

For all of these examples, security for the blockchain may optionally and preferably be provided through cryptography, such as public/private key, hash function or digital signature, as is known in the art.

Similarly, certification engine 122 is preferably in communication with the certification blockchain 134 for determining certification. The process of determining certification may optionally be similar to that as described in FIG. 1A, except that instead of a database, information is read from and written to a blockchain. Optionally the process of certification may comprise executing a smart contract for example.

As previously described, processor 152B may read codes from memory 150B, to enable processor 152B to cause information to be read from, or written to, virtual good blockchain 132 or certification blockchain 134.

FIG. 1C shows another exemplary non-limiting illustrative system for certifying virtual goods. In this non-limiting example, all activities are performed on or through user computational device 102. In a system 140, user computational device 102 again comprises user interface 104, virtual good repository 120, AR engine 118, display 106, and user input device 108.

These components preferably have the same or at least similar function to the components as described in FIGS. 1A and 1B. However, in this case virtual good engine 144 is preferably operated by user computational device 102, and access to the blockchain, in this case a virtual good blockchain 146, is provided through user computational device 102. It should be noted that it is the nature of the blockchain that, in fact, multiple copies are stored at all nodes, so in this non-limiting example, user computational device 102 would be such a node.

Certification engine 142 is in communication with a certification blockchain 148, again, acting as a node for that particular blockchain. Otherwise, the method of certification is preferably similar to that described in FIGS. 1A and 1B, except that in this case, all activities take place on or through user computational device 102.

As previously described, processor 152A may read codes from memory 150A, to enable processor 152A to cause information to be read from, or written to, virtual good blockchain 146 or certification blockchain 148.

FIG. 2 shows a non-limiting, exemplary system for verification of authenticity and/or ownership of a virtual good across a plurality of computational systems. For example, an owner of a virtual good may wish to be able to use such a virtual good across a plurality of computer systems, such as a plurality of mixed reality environments such as virtual worlds, augmented reality environments, a plurality of online or offline video games, one or more metaverses or spaces within the metaverse, web pages or other two dimensional online environments, other types of digital spaces and so forth. Any such digital space may be considered as an example of a mixed reality environment. A seller of a virtual good, or a licensor which permits the use of a design, logo and the like for a virtual good, may also choose to set one or more parameters according to which such use across a plurality of computer systems is permitted. These parameters are preferably connected to a mark, certificate or combination thereof associated with the virtual good, to determine for example which usage in which computer system(s) is permitted. Optionally the virtual good has both a mark and a certificate. Optionally the mark is visible or may be rendered visible within the computer system. The certificate may comprise the mark as previously described. Items with the same reference number as in previous figures have the same or at least similar function.

As shown in a system 200, a plurality of user computational devices 102, of which user computational devices 102A-102C are shown for the purpose of illustration and without any intention of being limiting, are in communication with server 112. In addition, a plurality of computational devices 270, of which computational devices 270A and 270B are shown for the purpose of illustration and without any intention of being limiting, are in communication with server 112. Computational devices 270A and 270B may each be a gateway, server or the like for a computer system, including without limitation a mixed reality environment such as a virtual world, augmented reality environment, a virtual reality environment optionally with glasses or headgear, an online or offline video game, one or more metaverses or spaces within the metaverse, a web page, an app or other two dimensional online environment, other types of digital spaces and so forth. Any such digital space may be considered as an example of a mixed reality environment. A user interacts with each such computer system through user computational device 102 which in turn communicates with computational device 270 through server 112.

As previously described, a user may purchase a virtual good, such as any suitable type of digital good, with a certificate indicating its authenticity. Such a virtual good may then be employed in a computer system as described above, through interactions with computational device 270 as mediated by server 112. Server 112 preferably analyzes the certificate to determine authenticity, and/or may also determine whether the user (through user computational device 102) is permitted to use such a digital good, according to certification engine 122 and/or virtual good engine 114. Optionally, server 112 analyzes one or more parameters associated with the certificate to determine whether the particular use of the digital good is permitted.

Recording of ownership transfers and parameters may be performed through a blockchain (not shown), which may be accessed through a blockchain gateway 250. Blockchain gateway 250 may read relevant information from, and write information to, the blockchain. Such information may then be provided to server 112, and/or to a computer system as mediated by computational device 270. Optionally, server 112 and/or computational device 270 may also provide information for being written to the blockchain, through blockchain gateway 250. Blockchain gateway 250 may support cross-chain and side chain activity, including reading from and writing to such chains, and may also act as a blockchain bridge for example.

Optionally, a user may be able to associate a certificate with a designed digital good that is not provided with the certificate, through communication between user computational device 102 and server 112. Virtual good engine 114 may for example determine whether the designed digital good that is not provided with the certificate meets the requirements of one or more parameters. Certification engine 122 may determine whether such a designed digital good may be loaned or otherwise transferred to another user, for example through a sale. Optionally such determinations are performed according to parameters provided by the digital certificate issuer, such as a brand holder for example. One or more smart contracts may be used, additionally or alternatively, to determine whether such uses and/or transfers are permitted, and/or may enforce the requirements of the parameters associated with the certificate.

Optionally, the owner of the mark and/or certificate may decide to apply the mark and/or certificate to a plurality of different virtual goods within one computational system or a plurality of computational systems as described herein. Optionally, one mark and/or certificate may be applied to such different virtual goods when sold to a plurality of new owners. Such application information and sales information is preferably stored on the blockchain as described herein, and is also preferably controlled through the previously described parameters, for example according to one or more smart contracts.

FIGS. 3A-3C show non-limiting, exemplary methods for determining rights and characteristics of an object through a blockchain. Turning now to FIG. 3A, a non-limiting exemplary method is shown in which an object actively holds rights and characteristics. A method 300 starts at 302, with the creation of a virtual object. The virtual object features parameters, as previously described. These parameters preferably relate to the rights and characteristics for the object, which are held by the object and are preferably recorded in the blockchain or other registry. At 304, the object is applied to a mixed reality world, which is preferably an authorized mixed reality world (AMR). For example, the object may be an item of clothing which is worn by a representation of the owner (avatar) in the AMR.

At 306, the limits of the object interaction are determined in the mixed reality world. These limits may be partially determined by the rules of that world, but are preferably determined by the parameters of the object itself. For example, the object may hold rights in relation to changes that may be made to the object. As described in greater detail below, the object may also hold rights in relation to whether copies may be made. By holding these rights and characteristics within the object, object interactions with the AMR may be more transparent. Furthermore, the owner or current possessor of the object has transparency in regard to what is permitted, and what is not permitted, in relation to the object, including with regard to interactions with the AMR. The owner may actually own the object outright, while the possessor may not own the object outright, but may instead have temporary custody of the object. When the terms "owner" or "possessor" are used, they are assumed to encompass the other term as well, unless otherwise indicated.

At 308, the characteristics of these interactions are determined. For example, the object may have particular features, which may relate to a personality or to other functions in regard to the mixed reality world.

At 310, the user, who may be the owner or possessor of the object for example, requests an increase in the number of copies of the object. At 312, such an increase may be provided according to the rights associated with the object, so that for example no copies may be permitted or a limited number of copies may be permitted. Optionally, no overall limitation is provided, but a limitation may be placed on the number of copies in the particular mixed reality world. At 314, these copies are also applied to the mixed reality world. The object and/or one or more copies may also be applied to additional mixed reality worlds at 316.

FIG. 3B shows another exemplary embodiment in which the rights and limitations of the object are associated with a smart contract, which is preferably tethered to the object. As shown, a method 350 preferably starts when the rights and limitations of the object are defined at 352, for example as previously described. At 354, the rights and limitations of the object may be defined differently for different roles of the user. For example, if the user is an authorized designer of the brand owner or other entity that has authorized an associated mark, then the user may be permitted to make changes and/or copies. A possessor of the object may have more limited rights, for example.

At 356, an oracle is determined, for receiving external information and reports, and for determining whether the smart contract may be executed and/or that conditions associated with the object are being fulfilled. At 358, the smart contract is initiated. This smart contract may be applied to determine whether a possessor is allowed to receive and possess the object, and/or whether the possessor is fulfilling the conditions of the smart contract and so may continue to possess the contract.

At 360, the smart contract is attached to the object. It is preferably also accessible through a wallet of the user, such as the possessor for example at 362. For example, it may be accessed by an AMR to determine whether the possessor has the right to bring the object into that AMR. At 364, the AMR determines the rights and limitations of the object through the oracle.

FIG. 3C shows another exemplary embodiment in which a governing block on the blockchain is associated with the object. A method 380 starts at 382, in which steps 352-356 of FIG. 3B are performed. At 384, the rights and limitations of the object are written to a governing block in the blockchain. The governing block is then attached to or otherwise associated with the object at 386. At 388, preferably the governing block is caused to be readable through the user's wallet. For example, once a possessor possesses the object, the wallet of the possessor is able to access the governing block, so that the rights and limitations associated with the object are transparent to the possessor. At 390, the AMR determines the rights and limitations of the object through the previously described oracle, which in this embodiment reads the governing block to determine these rights and limitations.

FIG. 4A shows a non-limiting exemplary method for determining how to create a mark for a virtual good and the virtual good itself. Turning now to FIG. 4A, there is shown a non-limiting exemplary method for determining how to create a mark for a virtual good and the virtual good itself. As shown on the flow 400, there is provided a method, which begins by first determining whether the real good should be copied in 402. For example, the virtual good may be created completely from scratch, that is to say without reference to a real physical good that has already been created, or is the virtual good being created on the basis of a copy or virtual facsimile of an actual good.

If it is the former, then the virtual good needs to be designed. If it is the latter, then parameters relating to the actual good, the physical good, need to be input in order to be able to create the virtual copy of the physical good.

Next in 404, regardless of whether the virtual good is being created from a copy of a physical good or whether it is being created de novo, that is, from scratch, the parameters of the virtual good need to be determined. These parameters may relate to appearance, how it appears in either augmented reality or virtual reality, when it may be displayed, how it may be used, colors and optionally other limitations, shapes, sizes, so forth.

Next, the branding of the virtual good is determined in 406. By branding, it is meant, will the virtual good have a particular brand name? Will it perhaps relate to a particular line of a particular brand? How is the branding going to affect the appearance of the virtual good?

In 408, the transfer rights of the virtual good are determined. These include whether or not the owner of the virtual good is allowed to sell it to anyone, whether in fact the owner of the virtual good is allowed to sell it at all or whether perhaps the owner of the virtual good must turn it back over to the brand owner for transfer or any other requirements on the transfer rights.

The transfer rights may also relate, as described in greater detail below, to a situation in which the owner of the virtual good wishes to transfer it between different mixed reality environments such as a virtual world in which the owner may participate.

In 410, it is determined whether a limitation is to be imposed on the number of copies of the virtual good to be created. For example, this may be a completely custom virtual good. Alternatively, it may be a limited edition, say, with a limited number of copies that could be created. For example, optionally a limited number of copies may be created. As a non-limiting example, perhaps only twenty copies can be created. Perhaps also, in that case, they would need to be numbered to indicate that, for example, this is copy nine out of twenty or any other information relating to the number limitation that is to be made.

Next, the virtual good ID is created in 412 and the ID is recorded on the blockchain in 414. This means that the virtual good ID is recorded so that others may read from the blockchain or write to the blockchain. Of course, this information may be encrypted so that not everyone is allowed access to it, but it provides a permanent record of the virtual good ID.

Next, the virtual good ID is connected to the virtual good in 416 and this connection is recorded on the blockchain. For example, a particular virtual good version may have a certain numbering such as nine out of 20, whatever the limitation is, may also have particular color, image, shape, size, other limitations. All of this information is preferably recorded on the blockchain in 418 so as to connect the virtual good to the virtual good ID.

Next, the virtual good is offered for sale with the certificate in 420. The certificate is one of authenticity and it allows the virtual good to be understood and later on verified as being actually a verified and therefore, authentic virtual good.

The owner then purchases the virtual good with a certificate in 422 and the purchase is recorded in the blockchain in 424.

FIG. 4B relates to a non-limiting exemplary method for creating an add-on for a virtual good. As a non-limiting example, a virtual good may be, for example, a watch. The watch may have as an add-on a watch band or a watch face. Whether or not it's permitted to add the watch band or watch face may be determined by such factors as ownership of the virtual good, transfer rights and other items, which are related to the virtual good parameters.

For a method 425, the process starts at any of 412 to 424 from FIG. 4A in 426. Next, the parameters of the add-on are determined in 428, which as previously described, maybe related to such factors as colors, sizes, shapes, styles, whether or not they're numbered, or created in a limited number, and so forth.

Next, the transfer rights of the add-on are determined in 430. For example, is the owner of the add-on allowed to transfer or sell the add-on to anyone, or is transfer or selling only permitted, for example to the owner of another identical or similar virtual good and so forth.

Next, the number of items that may be created is determined in 432 as previously described for the virtual good, and the add-on ID is created in 434. The ID is recorded on the blockchain in 436 and is then connected to the add-on in 438, again, as previously described for the virtual good. The connection is recorded on the blockchain in 440. The add-on may then be offered for sale with the certificate in 442 and an owner may purchase the add-on with the certificate in 444. The purchase is then recorded in the blockchain in 446.

FIG. 5 shows a non-limiting exemplary method for applying an object as a repository of value. As shown in a method 500, the method begins at 502, when an object is created with a plurality of parameters as previously described. This object is then transferred to a new owner or possessor at 504, also as previously described. At 506, each transfer is recorded, optionally on the blockchain or another registry. At 508, preferably the price of each transfer is also recorded, again optionally on the blockchain or another registry, in the same or a different location as for the transfer itself.

At 510, a potential buyer (or renter) interacts with the object, for example in an AMR. Such an interaction may cause information about the object to be displayed at 512, including for example the parameters associated with the object, whether it is for rent or sale, and the price of such a transaction. Optionally other information such as the provenance of the object may be displayed, including without limitation a brand owner, if any. Such information may be displayed through text, a separate message, audible verbal language, an offer through the user's wallet, and so forth. At 514, the value of the object may be applied to a transaction, for example to rent or purchase the object.

FIG. 6 shows a non-limiting, exemplary method for permitting a virtual good to be authenticated across a plurality of computer systems. As shown in a method 600, the process preferably begins at 602 in which a virtual good ID (identifier) is created, for example as a visual mark, audible mark, mark that is not human readable but otherwise computer readable and the like as described herein. The identifier may be associated with a plurality of copies of a single digital good for example, whether for purchase by a single user or by a plurality of such users.

At 604, one or more virtual good parameters are created. These parameters determine whether the virtual good may be used within a computer system such as that described with regard to FIG. 2, whether as a type of computer system or a particular named computer system. The parameters may govern transfer of the associated digital good, and/or whether digital goods that are not directly provided with the identifier (for example, a good that is designed separately and/or through a provider that is not the identifier issuer, such as a brand for example) may be associated with the identifier. The parameters may also determine whether a plurality of copies of a digital good may be associated with the identifier, and/or whether an owner of a digital good associated with the identifier may use such a digital good across a plurality of computer systems. With regard to the latter use, the parameters may determine whether digital goods instantiated in different technical implementations, such as across a plurality of video games, may be associated with a particular identifier. If permitted, a user could own a digital good and then use it across the plurality of video games, optionally even if the technical implementations were not directly compatible. The identifier may be associated with a certificate as previously described.

At 606, the virtual good ID and the parameters are recorded, for example in a database and/or blockchain, or any other suitable storage system.

At 608, the virtual good ID is connected to at least one digital good, whether as a single copy or as one of a plurality of copies of a digital good. The connection may be controlled according to the previously described virtual good parameters, for example as determined by the licensor. For example, the licensor may determine that only a digital good of a particular appearance may be associated with the virtual good ID. The licensor may also permit a designer to attach the virtual good ID to one or more digital goods designed by the designer, rather than by the licensor, again optionally according to one or more parameters that may restrict the ability of the designer to attach it to a particular designed good. For example, the designer may only be able to attach it to a digital good that has the appearance of a handbag or item of clothing, or the designer may only be able to attach it to a digital good that is considered to be a sufficient close replica of a physical good. Optionally, one or more parameters may relate to the avoidance of offensive features of the digital good, for example with regard to the word(s) used in a slogan on or associated with the digital good.

Optionally the virtual good ID is connected to a virtual good that in turn forms part of another virtual good, such as for example a visual logo that is attached to a digital good. Restrictions on such a combination may be determined according to one or more parameters, as described above.

If the ID was not previously associated with a certificate, optionally the ID is now associated with a certificate when connected to the virtual good. Also optionally, the ID enables the virtual good to be used and/or to operate in one or more authorized mixed reality environments. For example, the ID may enable the virtual good to be automatically verified, whether directly or through an optional associated certificate. The ID may also enable a smart contract to execute one or more operations on the virtual good, for example to transfer it to another user, through a sale or license for example; and/or to invalidate the virtual good as previously described, for example if a previously authorized user attempts to use the virtual good in an unauthorized manner and/or in an unauthorized mixed reality environment, to block an unauthorized transfer, to revoke authorization, for example when expired, and so forth.

At 610, the connection is preferably recorded, for example in a database and/or on a blockchain. Optionally a smart contract governs recording of such a connection, for example to permit greater control by a brand owner issuing and/or certifying the virtual good ID in terms of the parameters used and/or subsequent application of the virtual good ID.

At 612, the virtual good is optionally distributed across a plurality of computer systems, for example as described with regard to FIG. 2. Ownership of the virtual good may be recorded at 614, or alternatively may be recorded before distribution of the virtual good. At 616, the behavior of the virtual good, and/or of the owner of that virtual good in regard to using the virtual good, may be monitored across the plurality of computer systems, for example to verify that the usage and/or behavior complies with the previously described parameters. Again, such monitoring may be performed through one or more smart contracts.

FIG. 7 shows a non-limiting, exemplary method for permitting a virtual good to be authenticated across a plurality of computer systems according to a license. As shown in a method 700, the process preferably begins at 702 in which one or more license parameters may be determined. Such license parameters may relate to the mixed reality environment(s) in which the virtual good may be used, in how many such environments it may be used, whether making one or more copies by the user is permitted and if so, how many; whether emulation is permitted as described in greater detail below; other permitted use parameter(s); whether sale or transfer to another user is permitted and if so, under which circumstances; term of authorization; and optionally other term(s) and/or parameter(s) of the license in relation to authorization.

At 704, the virtual good license is then generated according to the above parameters. Optionally the license is implemented through a smart contract, at this stage or a later stage of the process, for example for authentication and/or for execution of other automated processes such as determination of authorized use, a transfer to another user, or for other control processes for example.

At 706, preferably a virtual good ID (identifier) is created, for example as a visual mark, audible mark, mark that is not human readable but otherwise computer readable and the like as described herein. The identifier may be associated with a plurality of copies of a single digital good for example, whether for purchase by a single user or by a plurality of such users. Optionally one or more virtual good parameters may be created and associated with the ID at this stage; alternatively or additionally, such parameters are created previously, for example when determining the license parameters.

At 708, if the associated smart contract for the license was not previously created, it is created here, to support the previously described processes. It may also be created as part of stage 710 or thereafter.

At 710, the virtual good ID and the license are recorded, for example in a database and/or blockchain, or any other suitable storage system.

At 712, the virtual good ID and the license are connected to at least one digital good, whether as a single copy or as one of a plurality of copies of a digital good. The connection may be controlled according to the previously described virtual good parameters, for example as determined by the licensor. For example, the licensor may determine that only a digital good of a particular appearance may be associated with the virtual good ID and the license. The licensor may also permit a designer to attach the virtual good ID and the license to one or more digital goods designed by the designer, rather than by the licensor, again optionally according to one or more parameters that may restrict the ability of the designer to attach it to a particular designed good. For example, the designer may only be able to attach the ID and license to a digital good that has the appearance of a handbag or item of clothing, or the designer may only be able to attach it to a digital good that is considered to be a sufficient close replica of a physical good. Optionally, one or more parameters may relate to the avoidance of offensive features of the digital good, for example with regard to the word(s) used in a slogan on or associated with the digital good. Such parameters may be added to the ID and/or to the license.

Optionally the virtual good ID and license are connected to a virtual good that in turn forms part of another virtual good, such as for example a visual logo that is attached to a digital good. Restrictions on such a combination may be determined according to one or more parameters, as described above.

If the ID was not previously associated with a certificate, optionally the ID is now associated with a certificate when connected to the virtual good. Alternatively the certificate may be incorporated in the license. Also optionally, the ID and/or the license enables the virtual good to be used and/or to operate in one or more authorized mixed reality environments. For example, the ID and/or the license may enable the virtual good to be automatically verified, whether directly or through an optional associated certificate, and/or through execution of a smart contract for example. The ID and/or license may also enable a smart contract to execute one or more operations on the virtual good, for example to transfer it to another user, through a sale or license for example; and/or to invalidate the virtual good as previously described, for example if a previously authorized user attempts to use the virtual good in an unauthorized manner and/or in an unauthorized mixed reality environment, to block an unauthorized transfer, to revoke authorization, for example when expired, and so forth.

At 714, the connection is preferably recorded, for example in a database and/or on a blockchain. Optionally a smart contract governs recording of such a connection, for example to permit greater control by a brand owner issuing and/or certifying the virtual good ID in terms of the license and/or subsequent application of the virtual good ID.

At 716, the virtual good is optionally distributed across a plurality of computer systems, for example as described with regard to FIG. 2. Distribution may also occur across a plurality of mixed reality environments. Ownership of the virtual good may be recorded at this time, or alternatively may be recorded before distribution of the virtual good. Preferably, before the virtual good is used in a computer system, which may comprise a mixed reality environment for example, the validity and permitted use of the virtual good is confirmed with a license, at 718.

At 720, the behavior of the virtual good, and/or of the owner of that virtual good in regard to using the virtual good, may be monitored across the plurality of computer systems, for example to verify that the usage and/or behavior complies with the previously described parameters. Again, such monitoring may be performed through one or more smart contracts. At 972, if the use of the virtual good does not follow the requirements of the license, the virtual good may be invalidated. Optionally, the license in this situation may operate as a contract with the virtual good, which governs the IP (intellectual property) embodied by the virtual good and hence its use. The user may be required to acknowledge the terms of the license before receiving, purchasing or otherwise being authorized to use the virtual good, for example by signing or at least acknowledging the role of the license as a contract.

FIG. 8 shows a non-limiting, exemplary method for purchasing an existing virtual good in a mixed reality environment. As shown in a method 800, the method begins when a purchaser or potential purchaser accesses a portal for potentially making a purchase. Such a portal may comprise a separate e-commerce website or app, and/or may be presented in a mixed reality environment as described herein. The portal may be contained within the mixed reality environment or may be separate from the mixed reality environment. The digital good (virtual good) may be presented to the purchaser, or the purchaser may request through a search, a mixed reality store and so forth. A person or avatar may hold and so present the virtual good, or the virtual good may exist and be present in the mixed reality environment.

At 804, the purchaser selects a particular virtual good and/or virtual good set as described herein, optionally with an emulation as described herein. At 806, the provenance is provided to the purchaser. The provenance preferably describes whether the virtual good is a copy and if so, of how many (optionally with sequential numbering such as "one of five hundred" for example), or whether the virtual good is original. The provenance preferably also describes any previous owners, with a name, alias or other identifier; and optionally shows the chain of ownership.

At 808, the purchaser reviews the contract terms. These terms preferably include the license terms in regard to permitted use(s) of the virtual good, whether an emulation is possible, whether the virtual good may be used across multiple mixed reality environments, transfer rights (if any), and also optionally whether the purchaser may make copies. If copies may be made, the contract preferably also indicates how many may be made and whether one or more copies may be sold or otherwise transferred.

At 810, the purchaser digitally signs the contract. Digital signing may be done with a user wallet or other crypto or blockchain identity, including without limitation NFT ownership. At 812, the purchaser provides payment for the virtual good. Stages 810 and 812 may be reversed; also payment may occur earlier in the process. Payment may include financial or non-financial remuneration. At 814, the purchaser receives the virtual good, with the attendant terms and rights.

FIG. 9 shows a non-limiting, exemplary method for applying standard brand language and filters to an object, for example to provide additional control over the object by the brand owner. A method 900 begins at 902, when the brand determines the object parameters. The brand may be any authorized holder of a mark, including without limitation a designer, an artist, a brand associated with goods and/or services related to the object, or a brand associated with goods and/or services also provided outside of the object itself and its uses.

At 904, the object parameters are applied to a smart contract as previously described. At 906, one or more filters are also applied to the smart object. At 908, an oracle is selected for the smart contract as previously described. The smart contract is then applied to the object at 910, also as previously described. At 912, the AMR to which the object is to be applied, or is already being applied, interrogates the oracle to determine the parameters and filters of the object. Such a determination further determines the permitted behavior and functions of the object within the AMR.

At 914, the oracle sends such information regarding the parameters and filters of the object to the AMR. At 916, the AMR then determines the behavior and function of the object accordingly.

FIG. 10 shows a non-limiting, exemplary method for permitting a virtual good to be emulated across a plurality of computer systems according to a license. A method 1000 begins at 1002 with the creation of a new virtual good, for example as previously described. At 1004, a virtual good emulation is created. The emulation may be created to be operative in one or more mixed reality environments, such as one or more virtual worlds for example. The mixed reality environments may be of a same or similar type, or may be of a different type. At 1006, an ID is recorded for both the virtual good and for each emulation. The ID may comprise one or more parameters, one or more license terms, an actual license and/or a certificate, as previously described. The ID may be determined and recorded as previously described. A separate ID may be recorded for the virtual good and for each emulation; alternatively, the virtual good and/or one or more emulations may share an ID.

At 1008, the one or more IDs is/are connected to the virtual good and to each emulation. The connection is then recorded at 1010. The connection and the recordation may be performed as previously described.

At 1012, a license is determined for the use of one or more emulations, if not previously determined when recording the ID. Optionally, even if previously determined when recording the ID, an additional license may be determined to control the use of one or more emulations. For example, such a license may be used to determine in which mixed reality environments an emulation may be used, and/or to which emulation(s) a user has access. If such a license is determined at 1012, then it is preferably recorded at 1014, for example as previously described. The virtual good emulation is then preferably distributed across computer systems, which may comprise one or more mixed reality environments, at 1016. At 1018, behavior of the virtual good is monitored for compliance, for example as previously described.

FIG. 11 shows a non-limiting, exemplary method for authorizing a virtual good set in one or more mixed reality environments. A method 1100 starts at 1102, with the creation of a new virtual good set. Such a set comprises a plurality of virtual goods and/or a plurality of components of virtual goods. The virtual goods and/or components may be related or may not be related.

At 1104, a license for the set is created. The creation process may be performed as previously described, but preferably also features one or more terms or requirements governing the set, for example in regard to use and/or transfer as previously described. At 1106, the license and optionally also an ID is recorded for the set, for example as previously described. At 1108, the license and optionally also the ID is connected to the set, for example as previously described. At 1110, the connection is recorded, for example as previously described. The set may then be distributed, for example as previously described for a virtual good, at 1112. At 1114, the behavior of the set may be monitored, as previously described for a virtual good.

FIG. 12 shows a non-limiting, exemplary method for determining an extended chain of provenance. As shown, a method 1200 begins with creating a new virtual good at 1202, for example as previously described. At 1204, the origin provenance is created, which may relate for example to the identity of the creator of the virtual good, any brand information associated with the virtual good, the creator and/or brand story, proof of creation and/or brand relationship, and so forth. At 1206, the origin provenance is recorded. At 1208, the virtual good is transferred to another owner (as previously noted, the term "owner" used within the description of this method may also relate to "possessor" of the virtual good, if actual ownership is not transferred). At 1210, the provenance is updated to reflect the new owner and/or possessor of the virtual good. At 1212, the provenance of the virtual good is interrogated, for example by an AMR and/or potential buyer for example. At 1214, stages 1208-1212 are repeated.

FIG. 13 shows a non-limiting, exemplary method for applying a generative rule set for object. As shown, a method 1300 begins by creating a general generative rule set for a brand and/or creator at 1302. A similar process may be followed for creating such a rule set for an AMR or other virtual world.

At 1304, an object specific rule set is preferably created for a particular object, although optionally this stage is skipped. The object specific rule set is preferably based on the general generative rule set, and may include greater restrictions and rules, fewer restrictions and rules, and/or different restrictions and rules. The object specific rule set is optionally also determined by the brand and/or creator. At 1306, the object specific rule set is applied to the object. If no object specific rule set is created, preferably the general rule set is applied.

At 1308, the applied rule set is recorded, preferably both in terms of the rules contained therein and also the application of the rule set to the specific object. At 1310, the object is entered to a mixed reality world, which is preferably an AMR. The rule set is then preferably updated according to the rules for that world at 1312. The behavior of the object is then constrained or at least guided by the combination of rules for the world and the rule set already applied to the object, at 1314.

FIG. 14 shows a non-limiting, exemplary method for a built-in emulator. As shown, a method 1400 begins at 1402, when a built-in emulator for an object is created. The built-in emulator may be created for a specific object and/or for a class of objects. At 1404, an emulator interface is added to the built-in emulator. The emulator interface preferably enables the emulator to communicate with an external world or other environment into which an object is to be placed or to enter, such as an AMR for example. The emulator interface enables the emulator to communicate with the external world or other environment, to be able to support the object interactions in the external world or other environment.

At 1406, the built-in emulator is applied to a specific object, to support its emulation in one or more environments as described above. At 1408, the emulator is recorded, for example on a blockchain or at a database as described herein. At 1410, the object is entered to an environment, including but not limited to mixed reality world such as an AMR for example. At 1412, the emulator preferably interrogates the environment through the emulator interface, although optionally the process is reversed (such that the environment interrogates the emulator through the emulator interface). At 1414, the object behavior in, and interactions with, the environment is supported through the emulator. Object behavior may be further governed by one or more rule sets as previously described. The emulator also preferably supports updating object behavior in the environment.

FIG. 15 shows a non-limiting, exemplary method for an external emulator. As shown, a method 1500 begins at 1502 in which an emulator is created for an environment, such as a virtual world for example. The virtual world may comprise an AMR for example. At 1504, an object emulator interface is preferably added to the emulator for the environment, to support interactions with an object in the environment. The emulator interface may for example comprise a plurality of such interfaces to support interactions with different objects operating according to different types of rendering, such as different rendering engines for example.

At 1506, the object and the emulator preferably interact, more preferably through the above described emulator interface. Such an interaction preferably supports interactions between the object and the environment, for example as previously described with regard to interactions for a built-in emulator.

At 1508, the object emulator is optionally adjusted as needed, for example to further support interactions between the object and the environment. At 1510, the object is entered to the environment, such as a mixed reality world for example, which preferably comprises an AMR. At 1512, the object behavior is preferably updated through the emulator, for example to support interactions of the object with the environment.

FIG. 16 shows a non-limiting, exemplary method for entering an object to an environment such as an AMR and for verifying it within such an environment. As shown in a method 1600, the method begins at 1602 when the user obtains a (digital, virtual) object. Next at 1604, the user preferably checks a verification portal, to verify that the object is authenticated.

The portal may comprise for example any suitable website or other user interface for verification. At 1606, the portal verifies the object as being authentic, for example on a blockchain or through another data storage system. At 1608, the portal preferably determines which environment is suitable, such as which AMR is permitted for the object, for example according to the previously described rules. The rules may relate to a rule set for the object itself and/or a rule set for the environment.

At 1610, if the portal determines that the environment is permissible for the object, the user then requests to add the object to the environment, such as for example the AMR. At 1612, the AMR verifies the object, optionally through portal but preferably through the blockchain and/or other data storage system for authentication. A non-limiting example of an authentication system is described below.

At 1614, if permitted, the object is entered to the environment such as the AMR for example.

FIG. 17 shows a non-limiting, exemplary method for a brand to determine a mark authorization system. As shown in a method 1700, the method starts at 1702 when the brand owner creates a licensing system. The licensing system preferably relates to rights for virtual objects and also restrictions on the behavior of such objects. The licensing system may for example be created to reduce the requirement for active ongoing involvement by the brand owner or alternatively may support many detailed interactions between the brand owner and object owners/creators/possessors.

At 1704, the brand owner preferably sets up parameters and rights for the objects within the licensing system. Again, the parameters and rights may relate to a more autonomous system or to a more deeply, manually controlled system. At 1706, an object is preferably created by the brand or by a brand authorized creator, through the licensing system or alternatively outside of the licensing system. At 1708, one or more permissions for such an object to interact with an environment, such as an AMR for example, are preferably set up through the licensing system.

At 1710, the brand owner preferably selects a blockchain for verification. Non-limiting examples of suitable blockchains are described with regard to FIGS. 19A-19C. Optionally any suitable blockchain may be selected. At 1712, a mark is preferably created for verification. The mark may be a visual mark for example, or any other suitable mark as described herein. The mark is preferably created such that it may be easily identified as being related to the brand owner, and hence is preferably recognizable as being a mark of authentication of objects associated with the brand, or at least authorized by the brand.

At 1714, the mark is preferably linked to the verification blockchain. At 1716, the verification blockchain is preferably connected to the previously described verification portal.

Figure 18:
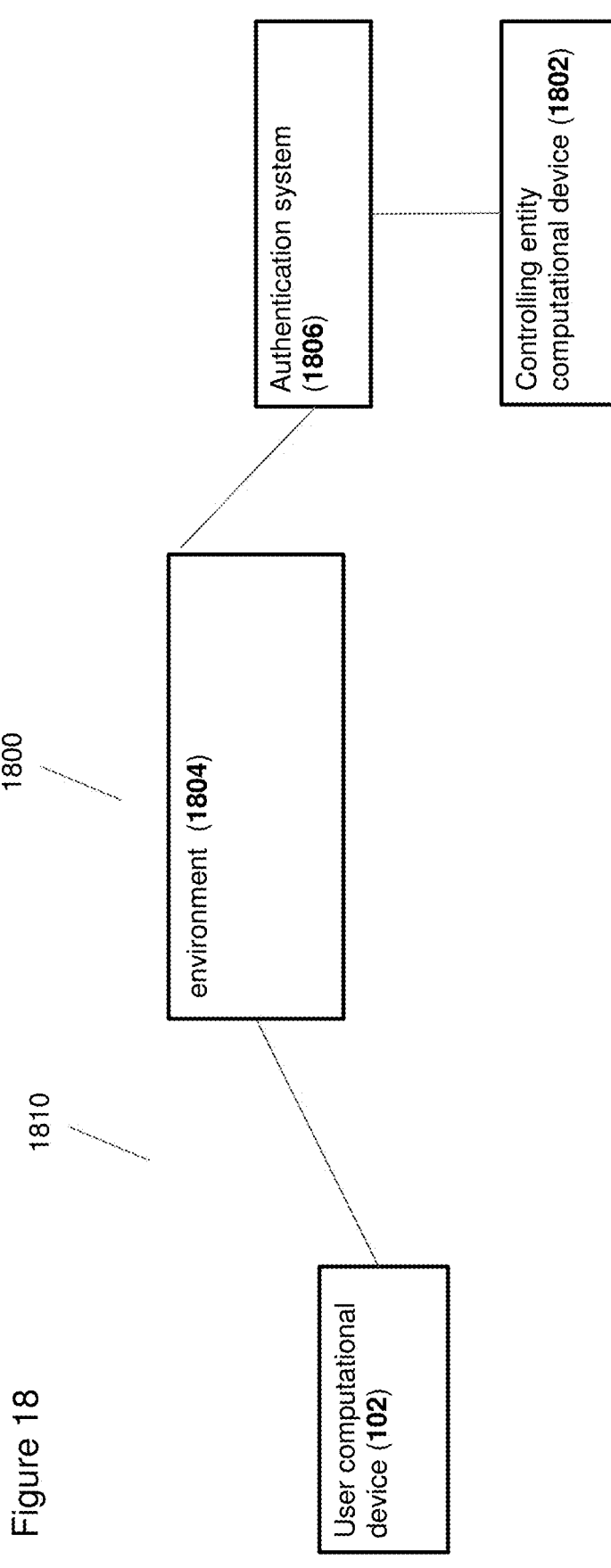

FIGS. 18, 19A-19C, 20 and 21 relate to exemplary, non-limiting embodiments of an authentication system. Turning now to FIG. 18, a non-limiting, exemplary general authentication system is shown. In a system 1800, the previously described user computational device 102 interacts with an environment 1804, such as for example an AMR. For example, the user may wish to enter an object to environment 1804 through user computational device 102. However, environment 1804 and/or the user through user computational device 102 may wish to authenticate the object and/or may require such authentication. Preferably, the user is not required to perform a separate authentication process, outside of the interaction with environment 1804.

Instead, environment 1804 preferably interacts with an authentication system 1806. Authentication system 1806 preferably receives data regarding which objects are authenticated, how to identify them and also which behavior(s) are permitted, through a controlling entity computational device 1802. Controlling entity computational device 1802 may for example interact with a brand, brand owner, creator and/or other entity with one or more objects to be authorized.

Authentication system 1806 preferably performs authentication according to the information received from controlling entity computational device 1802 and according to the request in regard to the object, received through environment 1804. Optionally and preferably, information regarding the user and/or the object are passed through environment 1804 to authentication system 1806. In turn, authentication system 1806 then returns information regarding whether the object is authenticated, and if so, which behavior(s) are permitted, to environment 1804. Authentication system 1806 may operate according to various optional embodiments in terms of how the data is recorded and the system for retrieving the necessary data.

Figure 19A:
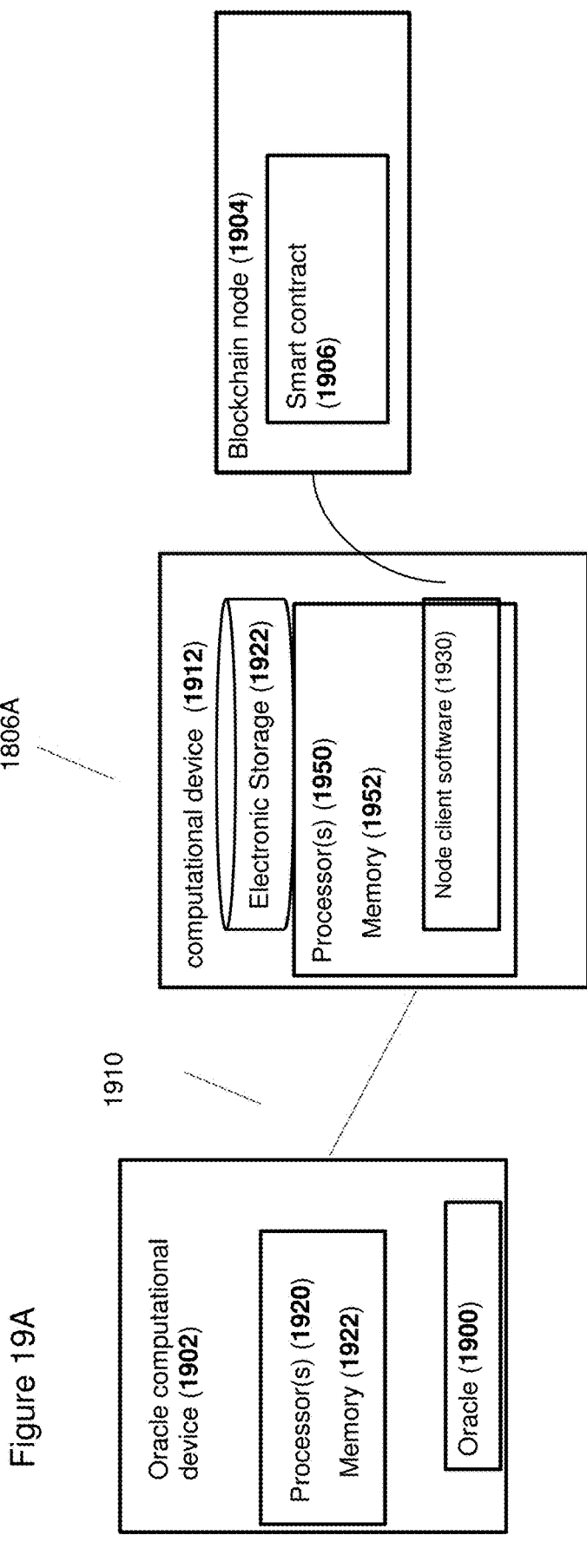
Figure 19B:
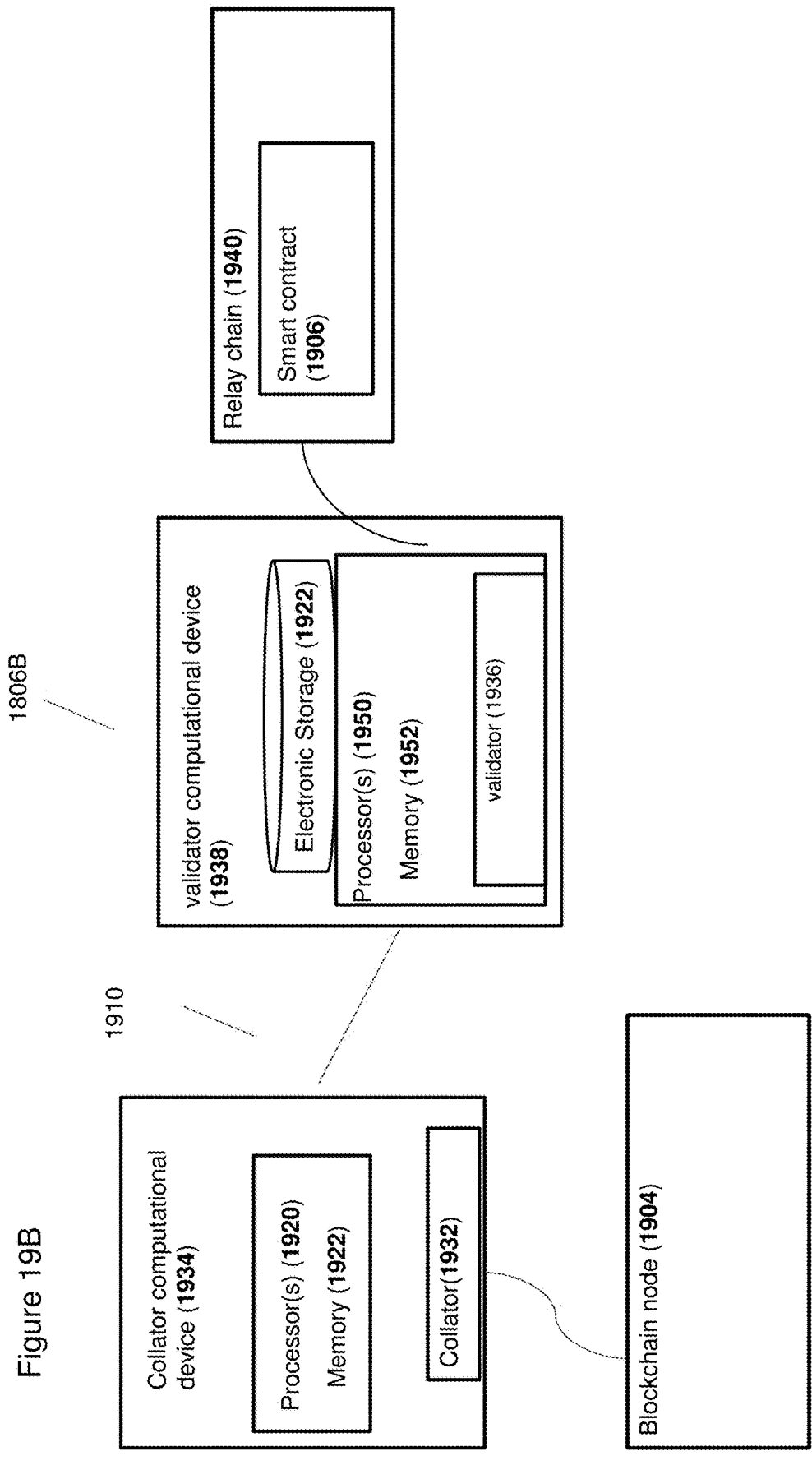
Figure 19C:
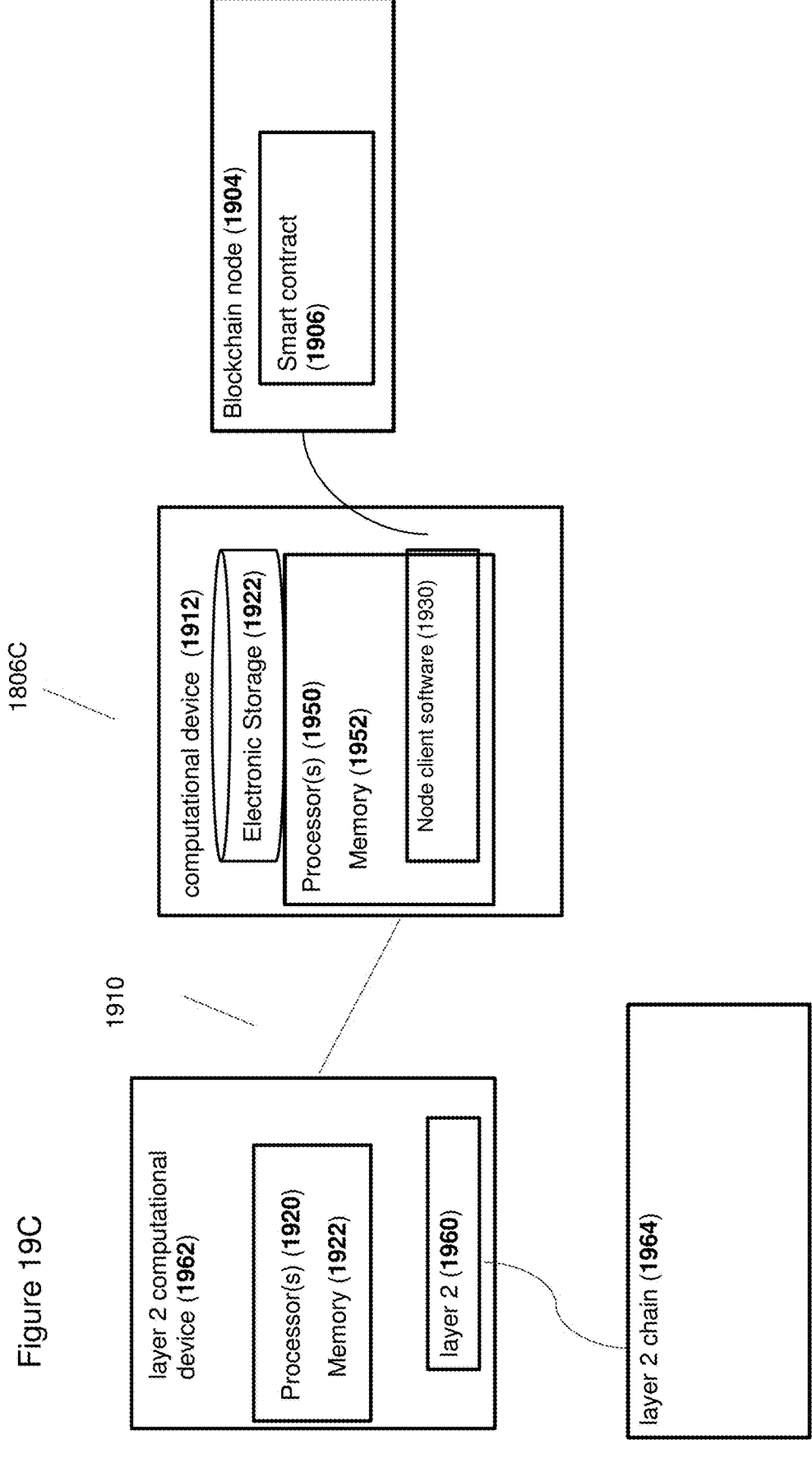

FIGS. 19A-19C relate to various exemplary systems for blockchain based systems for authentication. For example and without limitation, FIG. 19A shows a non-limiting, exemplary authentication system 1806A, featuring a combination blockchain and oracle authentication implementation. System 1806A features an oracle 1900, operated by an oracle computational device 1902. Oracle computational device 1902 comprises a processor 1920 and a memory 1922. A plurality of instructions are stored on memory 1922 and are executed by processor 1920, for supporting the operations of oracle 1900. Oracle 1900 preferably receives data external to a blockchain, exemplified as a blockchain node 1904. Such external data may be used to determine whether conditions have been met for a smart contract 1906 to execute. For example, oracle 1900 may receive information regarding a transaction into which a user entered through the previously described user computational device (not shown, see FIG. 18).

Such information is preferably based to a computational device 1912, which operates node client software 1930 for supporting operations of blockchain node 1904. Computational device 1912 communicates with oracle computational device 1902 through a computer network 1910. Oracle 1900 passes data which determines whether smart contract 1906 is to be executed to computational device 1912. Computational device 1912 preferably comprises a memory 1952 for storing a plurality of instructions for supporting the functions of node client software 1930, and a processor 1950 for executing these instructions. Optionally further data and/or instructions are stored in an electronic storage 1922.

FIG. 19B relates to a different implementation of the authentication system, shown as a system 1806B. In system 1806B, a parachain system is implemented for supporting blockchain interactions, such as operation of a smart contract. In this non-limiting example, a relay chain 1940 operates smart contract 1906. The functions of smart contract 1906 may be similar to those described with regard to FIG. 19A. Validation may be provided through a validator computational device 1938, which may provide data and information to relay chain 1940 to determine whether smart contract 1906 is to be executed.

Validator computational device 1938 preferably operates a validator 1936, to support validation and/or authentication of the object as previously described. Validator 1936 may for example rely upon execution of smart contract 1906 according to received information. Validator computational device 1938 preferably comprises a plurality of instructions for supporting validation, as stored in a memory 1952 and as executed by a processor 1950. Optionally an electronic storage 1922 is present as previously described.

A collator computational device 1934 preferably collates information and optionally also transactions, to be fed to validator computational device 1938, for example to determine whether smart contract 1906 is to be executed. Collator computational device 1934 preferably reads information from blockchain node 1904 to determine whether such information is to be passed to validator computational device 1938. Collator computational device 1934 preferably comprises a plurality of instructions stored on a memory 1922 and executed by a processor 1920, to support the operations of a collator 1932. Collator 1932 may gather necessary data and information to be passed to validator computational device 1938 as previously described.

FIG. 19C relates to a non-limiting, exemplary authentication system 1806C, which supports a layer 2 blockchain implementation, such as that supported by polygon for example. A layer 2 computational device 1962 preferably operates layer 2 software 1960, to collect information and data for determining whether smart contract 1906 is to be executed. Layer 2 software 1960 preferably reads information from, and optionally writes information to a layer 2 chain 1964. The operation may otherwise be similar to that for FIG. 19A.

Figure 20:
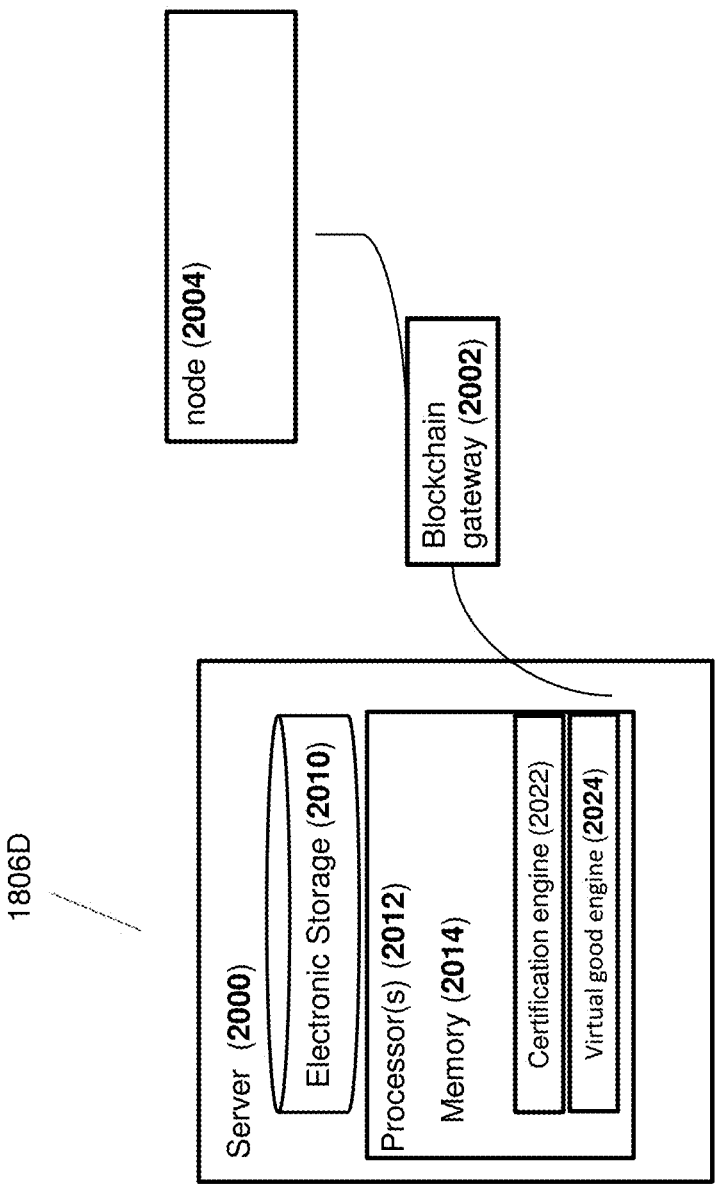

FIG. 20 shows a non-limiting, exemplary authentication system 1806D, which features a blockchain implementation but without a smart contract. In this implementation, authentication information is stored on node 2004 in the form of a record. Server 2000 features a memory 2014 for storing a plurality of instructions, for execution by processor 2012, to support a certification engine 2022 and optionally also a virtual good engine 2024. In this example, server 2000 receives a request for authentication. Certification engine 2022 then interacts with node 2004 to obtain the necessary details from the stored record, more preferably through interaction with a blockchain gateway 2002.

Figure 21:
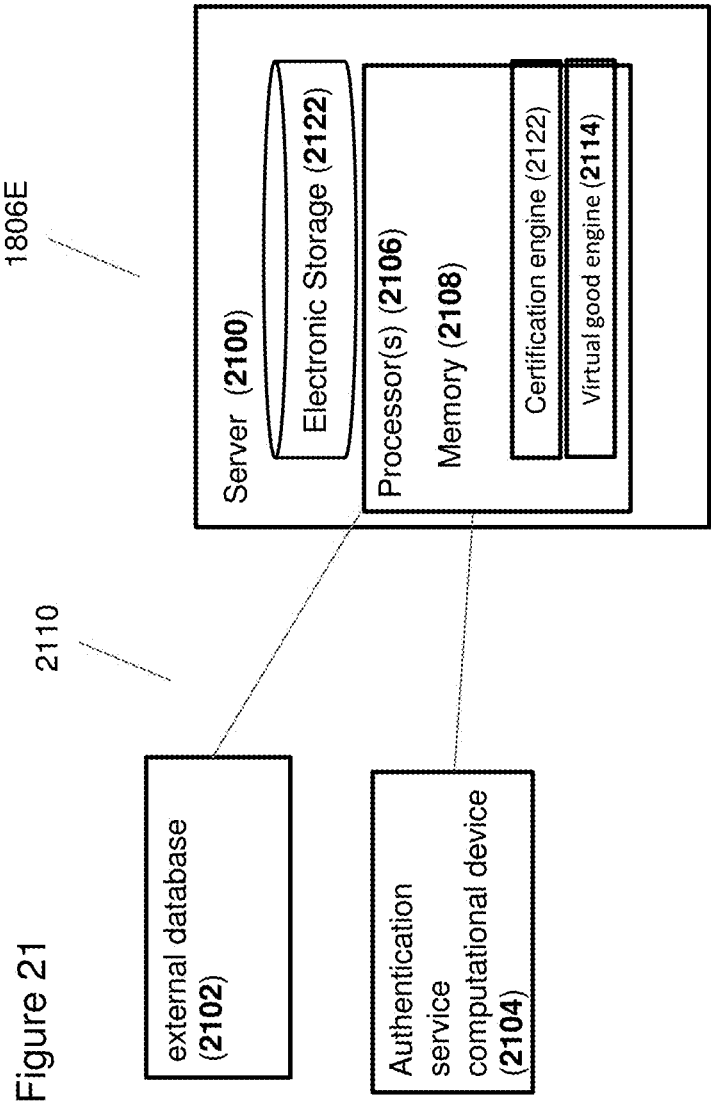

FIG. 21 shows a non-limiting, exemplary authentication system 1806E, which does not feature a blockchain implementation. Instead, authentication information is stored in an external database 2102, optionally as supported by an authentication service computational device 2104.

FIG. 22 relates to a non-limiting, exemplary method for a digital twin. As shown in a method 2200, the method starts at 2202 with the creation of a virtual good. At 2204, the virtual good is optionally and preferably linked to an instance of a physical good. At 2206, a linked origin provenance is preferably created, combining the provenance of the linked physical and virtual goods. At 2208, the linked provenance is recorded. At 2210, the virtual good is transferred to another owner. At 2212, the provenance is updated to indicate the transfer. Optionally, transfer of the virtual good is accompanied by transfer of ownership of the physical good. At 2214, a potential recipient interrogates the provenance of at least the virtual good and optionally also of the physical good. At 2216, steps 2210-2214 may be repeated.

As a non-limiting example of linking the virtual good to the physical good, a tokenized physical key may interact with the system as described herein. The physical key may be embedded in, attached or connected to, or representative of, the physical good. For example, for smaller physical goods, such as clothing or shoes for example, the physical key may be embedded in, attached or connected to the physical good. For larger physical goods, such as vehicles, airplanes, ships or other larger items, a representation of the physical good may be provided, such as a model of the physical good for example.

According to these embodiments, the system may be extended to incorporate tokenized physical keys that act as "physical twins" of the virtual goods. Each physical key may contain an embedded NFC chip, QR code, or similar tagging technology that links it to the corresponding virtual good. The physical key may be representative of the physical good, as for example in regard to a model of such a physical good, or may be embedded in, attached or connected to the actual physical good.

In relation to a larger physical good, such as a yacht for example, when a user purchases or gains ownership of a virtual good (e.g. a yacht NFT), they are provided with a physical model of that item (the yacht) embedded with an NFC chip. This model serves as the physical key. To access full control and privileges associated with their virtual yacht NFT within AMR environments, the user preferably is required to use their digital wallet (proving NFT ownership) as well as scan the NFC chip in their physical yacht model. This two-factor authentication provides added security.

Scanning the physical key NFC, or otherwise activating the physical key, may also trigger an augmented reality experience overlaid on the physical model, or grant access to a full digital twin of the yacht in virtual reality. The digital twin may for example mirror the real-time status and data from the actual physical yacht. The user's access rights to control the virtual yacht or the extent of data they can view from the digital twin are preferably governed by the rights, permissions and restrictions encoded into the NFT and its associated certification record on the blockchain, for example as previously described.

Owners may be permitted to grant non-owners limited "guest access" to subsets of the yacht's digital twin data (e.g. location, onboard status) by lending them the physical key temporarily or virtually.

As another non-limiting example, the NFT tokens may also function as a certificate of authenticity or proof of a specific attribute. For example, a carbon credit accreditation program operating with such tokens may mint carbon credit tokens, fractionalize them, and distribute them to be chained to physical products with carbon footprints. These fractional NFTs of the carbon tokens may be created to precisely counter the carbon footprint of the associated product. Optionally the carbon token is a whole token and is not fractionalized, according to the size of the carbon token and the relative carbon footprint of the associated product.

The mark associated with the token serves as proof that the carbon credit is genuine and has been used to offset the carbon footprint of the specific product. Once the token is paired with a product, it is considered "used" and is no longer viable for resale. This mechanism prevents double-counting or double-use of the same carbon credit.

Such a token and mark may be associated with a physical good, such as a pair of sneakers for example. In this non-limiting example, a sneaker company that wants to offset the carbon footprint of its products partners with a carbon credit accreditation program that mints carbon credit tokens. These tokens are fractionalized if necessary, such that each token or fraction thereof represents a specific amount of carbon offset.

When a customer purchases a pair of sneakers, the sneaker company associates a whole or fractional carbon credit NFT with the unique identifier of those sneakers, according to the carbon footprint of the sneakers. This pairing is recorded on a blockchain, creating an immutable record of the carbon offset for that specific pair of sneakers.

The physical sneakers themselves may have an embedded NFC chip or a QR code that, when scanned, reveals the associated carbon credit NFT. This associated physical mark or device serves as a certificate of authenticity, proving that the carbon footprint of those sneakers has been offset by a genuine carbon credit. If the sneaker company allows customers to resell their sneakers, the associated carbon credit NFT may then be transferred along with the ownership of the sneakers. The new owner is able to verify the authenticity of the carbon offset by checking the blockchain record.

Optionally, this process may be extended to relationships between people and tokens, rather than between physical goods and virtual goods. This extension may relate to transactional relationships between people with the NFT as the conduit. This concept involves using NFTs as a means to facilitate relationships and interactions between individuals, particularly in the context of support, sponsorship, or mentorship. The NFT serves as a representation of a person or their creations, and the purchase of the NFT establishes a connection between the buyer and the person behind the NFT.

As a non-limiting example, support may be provided to a foster child through this system, by providing a platform that creates avatar NFTs representing foster children. Each NFT is unique and linked to a specific child, serving as their digital identity. When someone purchases one of these NFTs, they become a sponsor or supporter of that particular child. The real life identity of the child and/or identifying information associated with that child may not be provided through the NFT itself, to maintain the child's privacy.

The cryptocurrency used to purchase the NFT is transferred to the foster child's wallet, which is managed by their guardian. The funds are then used to support the child's education, art therapy, and other essential needs. As part of the sponsorship, the child engages in art therapy sessions and creates artwork. Digital versions of these artworks are sent back to the NFT holder as a form of transactional exchange. This exchange allows the sponsor to witness the progress and growth of the child they are supporting, while also receiving tangible expressions of gratitude. The foster child's artwork can be displayed within the NFT itself, creating an evolving gallery that showcases their creative journey. This gallery serves as a visual representation of the positive impact the sponsor is making in the child's life.

Moreover, the NFT holder can further support the child by sharing the digital NFT and physical, marked prints of the child's artwork with others. They can encourage viewers to add notes of encouragement and send additional funds to the child's wallet. This process creates a ripple effect of support and empowers a broader community to get involved. The platform can also provide a centralized site where interested individuals can explore the avatar NFTs of different foster children and choose one to sponsor. This process creates a network of supporters who are actively engaged in making a difference in the lives of these children.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system to control behavior of an authorized virtual good in an AMR (authenticated mixed reality) environment, comprising a user computational device, said user computational device comprising a user device memory, a user display and a user device processor; a server in communication with said user computational device, said server comprising a server memory and a server processor; and a mark associated with the virtual good, wherein a set of parameters is associated directly with the virtual good, with the mark or a combination thereof, to determine permitted behaviors of the virtual good in the AMR environment, and wherein the mark also permits the virtual good to be identified as the authorized virtual good, wherein each of said user device processor and said server processor is configured to perform a defined set of operations in response to receiving a corresponding instruction selected from a predefined native instruction set of codes, said codes comprising a first set of machine codes selected from the native instruction set for receiving a request for identification of the virtual good; a second set of machine codes selected from the native instruction set for analyzing the request and for reviewing information to determine whether the virtual good has been identified according to said mark; a third set of machine codes selected from the native instruction set to enable the virtual good to be accessed through said user computational device, once the virtual good has been identified; and a fourth set of machine codes for determining permitted behavior of the virtual good in the AMR environment; wherein each of the first, second and third sets of machine code is stored in the user device memory or in the server memory, and is executed by the user device processor or the server processor; the system further comprising a certification storage for storing identification information, and wherein said server processor identifies said virtual good according to information retrieved from said certification storage; wherein said certification storage stores a virtual good identifier and a plurality of parameters describing said virtual good.

2. The system of claim 1, wherein said mark comprises an AMR mark, and wherein said AMR mark is displayed visually in a mixed reality environment such that said mark is visible through said display of said user computational device.

3. The system of claim 2, wherein said mark is associated with an authorized producer of an equivalent physical good.

4. The system of claim 3, further comprising at least one additional server to operate said AMR environment, wherein said certification storage comprises a blockchain, wherein said identification information is stored on said blockchain and wherein said identification information stored on said blockchain determines identification of said virtual good for said AMR environment.

5. The system of claim 4, wherein said at least one additional server communicates with said server, said user computational device or both to determine limits of virtual good interaction with said AMR environment.

6. The system of claim 5, wherein said virtual good comprises a digital object with autonomy in regard to a set of rights, permissions and restrictions; and wherein said limits of virtual good interaction with said AMR environment are determined in regard to said set of rights, permissions and restrictions.

7. The system of claim 6, wherein said virtual good interacts with said AMR environment through an interface; wherein said interface supports emulation of said virtual good in said AMR environment and also determines said limits in regard to said set of rights, permissions and restrictions.

8. The system of claim 7, wherein said interface further supports imposition of restrictions by said AMR environment on said virtual good interactions.

9. The system of claim 8, wherein said interface comprises an emulator controlled through said AMR environment.

10. The system of claim 9, wherein said interface comprises an emulator controlled through said virtual good.

11. The system of claim 10, wherein said limits of said virtual good interaction with said AMR environment are determined according to a smart contract stored on said blockchain.

12. The system of claim 11, further comprising an oracle for supplying external data in terms of smart contract execution, wherein said smart contract is executed through a virtual machine on said blockchain according to information supplied by said oracle.

13. The system of claim 11, further comprising a collator for receiving external data and also transaction data; a validator for validating said data; and a relay chain for executing said smart contract, wherein said smart contract is executed according to data validated by said validator.

14. The system of claim 11, further comprising a layer 2 computational device for receiving external data and also transaction data, and for determining whether said smart contract is executed according to said data.

15. The system of claim 14, further comprising a wallet accessible by said user computational device, wherein at least possession of said virtual good is mediated through said wallet, wherein said wallet stores a blockchain record of ownership of said virtual good.

16. The system of claim 15, wherein at least possession of said virtual good is determined according to a governing record on said blockchain.

17. The system of claim 16, wherein a creator of said virtual good, a brand owner of said virtual good, or a combination thereof, determines parameters for determining behavior of said virtual good; wherein said virtual good parameters are applied to said smart contract, to a governance record on said blockchain or a combination thereof; and wherein said virtual good interacts with said AMR environment according to said virtual good parameters.

18. The system of claim 17, wherein said creator, said brand or a combination thereof creates a generative rule set for determining virtual good behavior, and then creates a virtual good specific rule set from said generative rule set; wherein said virtual good parameters are determined according to said virtual good specific rule set.

19. The system of claim 18, wherein said AMR environment has an associated generative rule set; wherein behavior of said virtual good is determined by a combination of said virtual good specific rule set and said AMR environment associated generative rule set.

20. The system of claim 19, wherein said user computational device comprises a VR headset and a VR console, wherein said VR console comprises said user device processor and said user device memory, and wherein said VR console causes identification information about said virtual good to be visually displayed by said VR headset, including an association with an authorized producer.

* * * * *